(12) United States Patent
Miyazawa et al.

(10) Patent No.: US 9,766,841 B2
(45) Date of Patent: Sep. 19, 2017

(54) PRINTING SYSTEM, SERVER, RECEPTION APPARATUS, AND PRINTING METHOD USED BY PRINTING SYSTEM

(71) Applicant: SEIKO EPSON CORPORATION, Tokyo (JP)

(72) Inventors: Shigeyoshi Miyazawa, Nagano (JP); Takefumi Ogasawara, Kanagawa (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 14/678,549

(22) Filed: Apr. 3, 2015

(65) Prior Publication Data
US 2015/0293727 A1 Oct. 15, 2015

(30) Foreign Application Priority Data

Apr. 10, 2014 (JP) ................. 2014-081074

(51) Int. Cl.
*G06F 3/12* (2006.01)
*G06Q 30/02* (2012.01)
*G06F 15/00* (2006.01)

(52) U.S. Cl.
CPC .......... *G06F 3/1224* (2013.01); *G06F 3/1203* (2013.01); *G06F 3/1285* (2013.01); *G06Q 30/0207* (2013.01); *G06Q 30/0241* (2013.01); *G06F 3/1229* (2013.01)

(58) Field of Classification Search
None
See application file for complete search history.

(56) References Cited

U.S. PATENT DOCUMENTS

| 2002/0046101 A1* | 4/2002 | Ogawa ................... G06Q 30/02 705/14.31 |
| 2005/0147440 A1* | 7/2005 | Nakanishi ............ B41J 2/17546 400/62 |
| 2013/0135668 A1* | 5/2013 | Minagawa ............ G06F 3/1204 358/1.15 |

FOREIGN PATENT DOCUMENTS

JP         2009-009524 A       1/2009

* cited by examiner

*Primary Examiner* — Helen Q Zong
(74) *Attorney, Agent, or Firm* — Global IP Counselors, LLP

(57) ABSTRACT

A transmission apparatus transmits an e-mail having a content attached thereto to a mail address destination of a printer. A server having a function of a mail server acquires a thumbnail image of a content acquired from the received e-mail and printing setting information and transmits the thumbnail image and the printing setting information to a terminal. A receiver confirms details of the content and printing setting details on the terminal, and then transmits a printing request notification from the terminal to the server. The server transmits printing data converted from the content and causes the printer to print the content. After the printing data is transmitted, the server performs a process of giving points according to the printing of the content to a user of the reception apparatus.

17 Claims, 11 Drawing Sheets

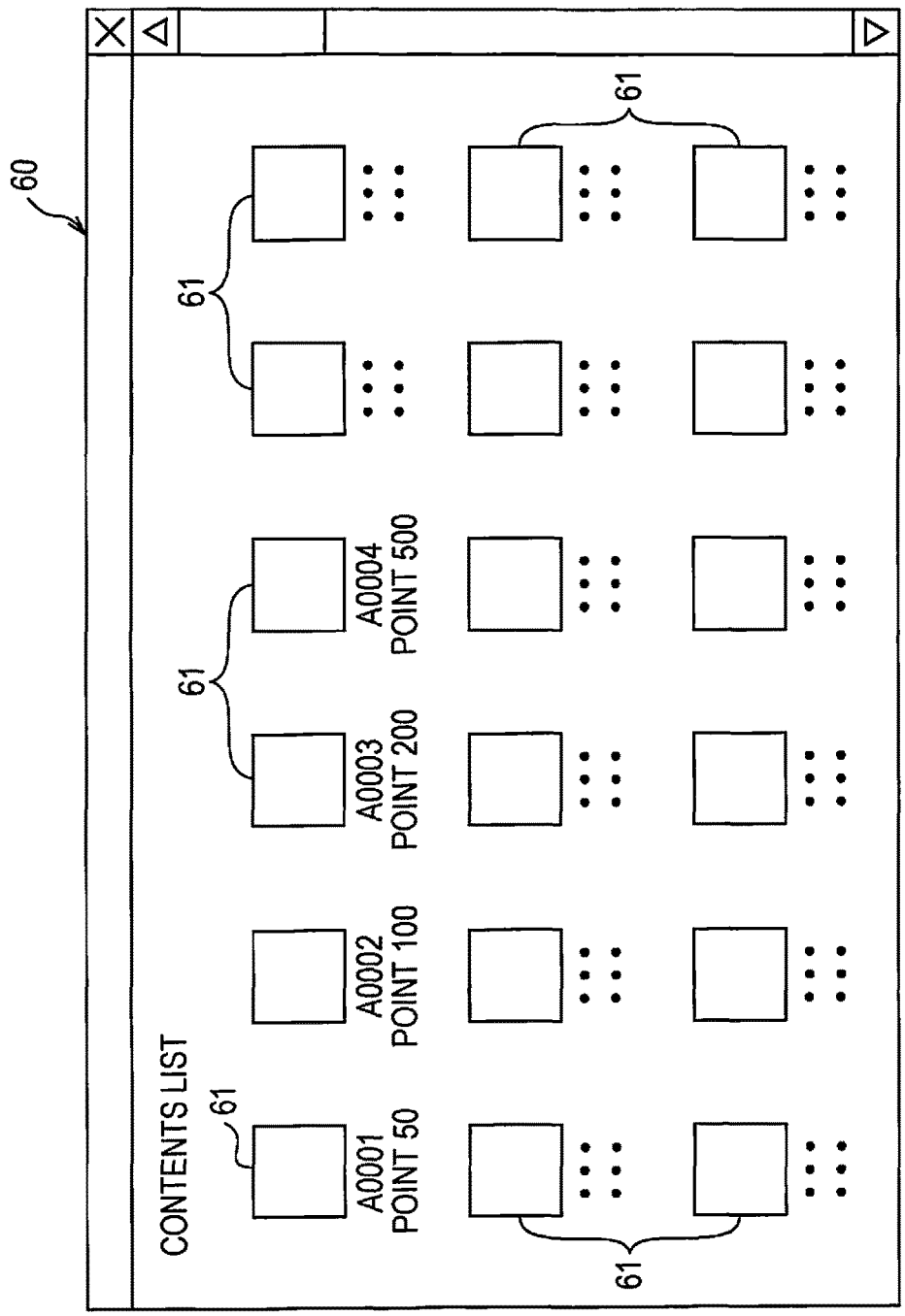

FIG. 7A

| USER ID | THE NUMBER OF POINTS |
|---|---|
| ... | ... |
| a0001 | A |
| ... | ... |
| b0001 | B |
| ... | ... |

MOVE C POINTS (from B to A)

FIG. 7B

| USER ID | THE NUMBER OF POINTS |
|---|---|
| ... | ... |
| a0001 | A − C |
| ... | ... |
| b0001 | B + C |
| ... | ... |

FIG. 8A

| USER ID | THE NUMBER OF POINTS |
|---|---|
| ... | ... |
| a0001 | A |
| ... | ... |
| b0001 | B |
| ... | ... |

MOVE D POINTS (from A to B)

FIG. 8B

| USER ID | THE NUMBER OF POINTS |
|---|---|
| ... | ... |
| a0001 | A + D |
| ... | ... |
| b0001 | B − D |
| ... | ... |

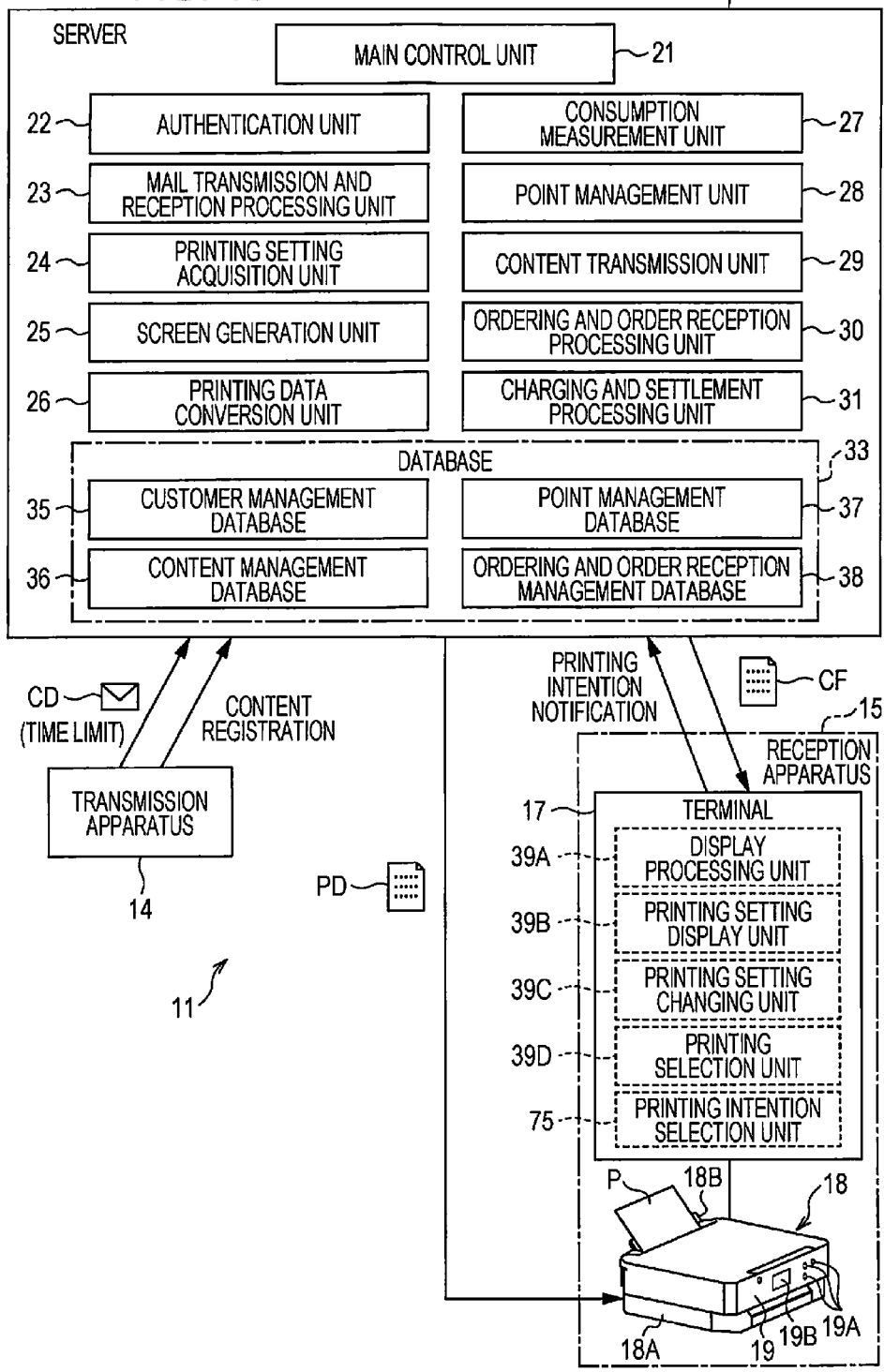

PRINTING SYSTEM, SERVER, RECEPTION APPARATUS, AND PRINTING METHOD USED BY PRINTING SYSTEM

CROSS REFERENCES TO RELATED APPLICATIONS

This application claims priority to Japanese Application No. 2014-081074, filed Apr. 10, 2014, the entirety of which is incorporated by reference herein.

BACKGROUND

1. Technical Field

The present invention relates to a printing system that performs point management according to printing of a content, a server, a reception apparatus, and a printing method used by the printing system.

2. Related Art

For example, JP-A-2009-009524 discloses a system in which not only a user of a guest terminal (reception side) but also a user of a registrant terminal (transmission side) bears a printing cost. The registrant terminal designates a product in an order reception server, and the guest terminal designates an image to be printed on the product. The order reception server prints an image designated by a print server on the product and delivers the printed product to the user of the guest terminal. Costs of the product and printing are paid and borne by the user of the registrant terminal.

However, the above-mentioned system disclosed in JP-A-2009-009524 performs printing on the print server side, that is, a trader side providing a service, and performs settlement between a registrant on a transmitter side and the trader. For this reason, it is not possible to reduce the burden of a printing cost incurred on a receiver side in a case where a user on the transmission side designates a desired party and transmits a content to the party and a user on the reception side prints the content using his or her own printer.

A content and the like for an advertisement are desired to be viewed by a user. However, when a user prints a content using his or her own printer, the user of the reception apparatus has to bear the cost for the consumption of printing materials such as paper and ink. For this reason, the user of the reception apparatus cares about the printing cost and thus is not likely to print a content.

SUMMARY

An advantage of some aspects of the invention is to provide a printing system allowing a user of a reception apparatus to promote the printing of a content transmitted from a user of a transmission apparatus, a server, a reception apparatus, and a printing method used by the printing system.

Hereinafter, means for resolving the above-mentioned problem and the operational effects thereof will be described.

A printing system includes a transmission apparatus that transmits a content to be printed, a reception apparatus that receives the content and performs printing control of the content, and a server that manages points for using a service for each of users including a user of the transmission apparatus and a user of the reception apparatus. The server performs a process of transmitting points according to the printing of the content to the user of the reception apparatus from the user of the transmission apparatus.

According to this configuration, points according to the printing of a content are transmitted to the user of the reception apparatus from the user of the transmission apparatus. Accordingly, the user of the reception apparatus can print the content transmitted from the user of the transmission apparatus without particularly caring about a printing cost. Therefore, the user of the reception apparatus can promote the printing of the content transmitted from the user of the transmission apparatus.

BRIEF DESCRIPTION OF THE DRAWINGS

The invention will be described with reference to the accompanying drawings, wherein like numbers reference like elements.

FIG. 6 is a schematic diagram illustrating a contents list screen.

FIGS. 7A and 7B illustrate a point management DB; FIG. 7A is a schematic diagram illustrating a process of transmitting points from a transmitter to a receiver, and FIG. 7B is a schematic diagram illustrating a result of the point moving process.

FIGS. 8A and 8B illustrate a point management DB; FIG. 8A is a schematic diagram illustrating a process of transmitting points from a receiver to a transmitter, and FIG. 8B is a schematic diagram illustrating a result of the point moving process.

FIG. 13 is a block diagram illustrating a functional configuration of a printing system according to a third embodiment.

DESCRIPTION OF EXEMPLARY EMBODIMENTS

First Embodiment

Hereinafter, a printing system according to a first embodiment will be described with reference to the accompanying drawings.

Figure 1:
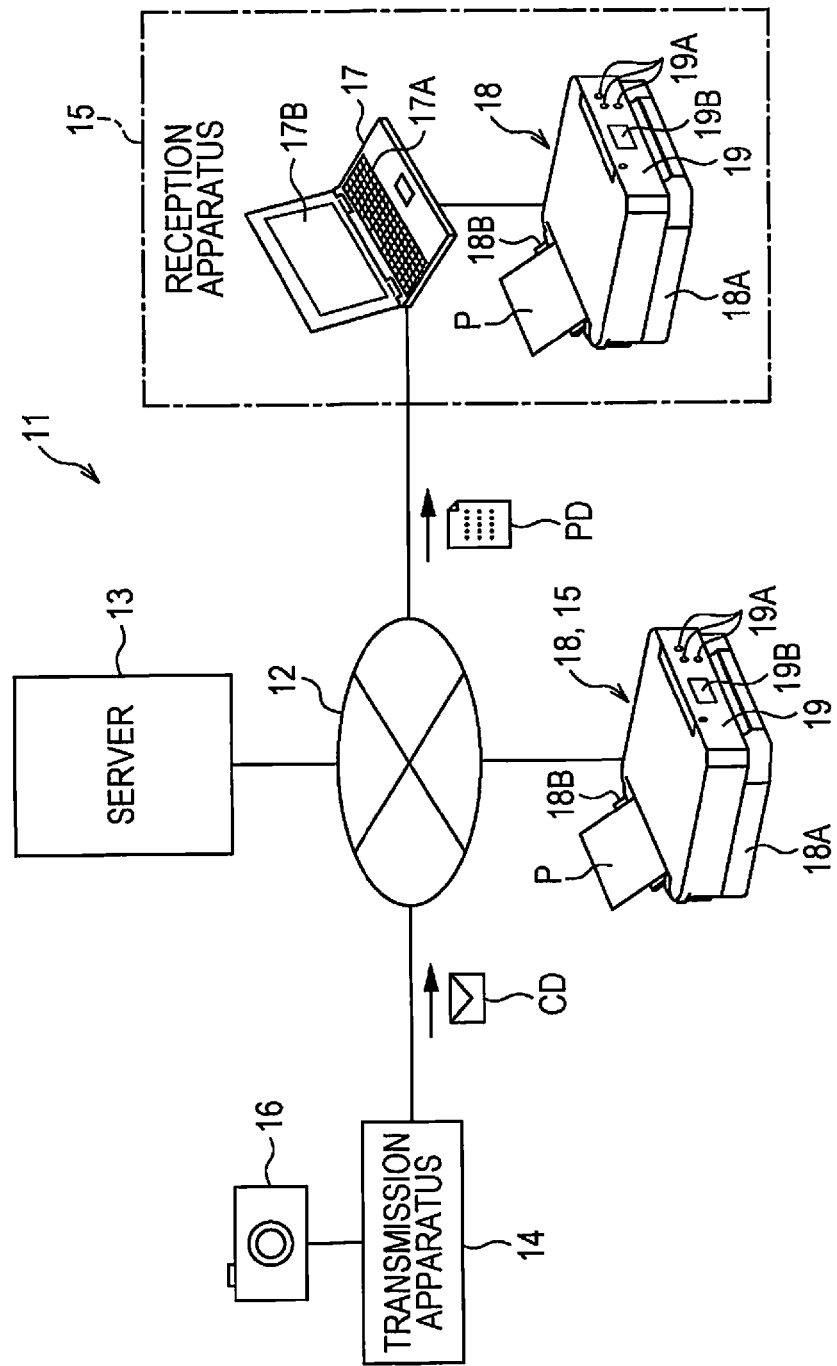
FIG. 1 is a schematic diagram illustrating a printing system according to a first embodiment.

As illustrated in FIG. 1, a printing system 11 includes a server 13, a transmission apparatus 14, and a reception apparatus 15 which are connected to each other through a network 12 so as to be capable of communicating with each other. The transmission apparatus 14 transmits a content to be printed to the reception apparatus 15 through the network 12. In addition, the reception apparatus 15 receives and prints the content transmitted from the transmission apparatus 14 through the network 12. The server 13 performs a printing data conversion process of converting the content into printing data in order to prevent the content from being leaked for the purpose other than printing and transmitting the printing data to the reception apparatus 15. In addition, the server 13 provides a service including a point moving process of transmitting points according to the printing of the content from a user (transmitter) of the transmission apparatus 14 to a user (receiver) of the reception apparatus 15 on the condition that the content received in the receiver using the reception apparatus 15 is printed. The server 13 provides various services including an internet sales service for a product such as a printing material, and points can be used in such various services. In this manner, the server 13 manages points for using a service.

The transmission apparatus 14 is constituted by a terminal such as a personal computer (PC) of a transmitter. The transmitter creates a content (for example, a file) including at least one of an image and a document. Examples of a content CD include a picture captured by a digital camera 16, an image drawn by computer graphics or the like, an advertisement content for introducing a product or a service, and the like. The transmitter transmits the created content CD from the transmission apparatus 14 through the server 13 to the reception apparatus 15 to thereby provide a content CD to be printed to a receiver. At this time, the transmitter transmits the content CD by designating printing conditions (printing setting details) which are desired when the receiver prints the content CD.

In addition, as illustrated in FIG. 1, the reception apparatus 15 may be configured to include a terminal 17 such as a personal computer (PC) and a printer 18, or may be configured to be constituted by the single printer 18 connected to the network 12. In other words, it is sufficient for the reception apparatus 15 to have a network communication function of receiving the content CD transmitted through the network 12 and a printing function of printing the content CD. Accordingly, the reception apparatus 15 may be constituted by a system including the terminal 17 having a network communication function and the printer 18 having a printing function, or may be constituted by the single printer 18 having a network communication function. In a case of the system, the terminal 17 and the printer 18 are not necessarily connected to each other, and may be associated with the same user registered in the server 13 as long as the printer 18 has a network communication function. In the example of FIG. 1, the printer 18 is connected to the terminal 17 in a wired or wireless manner so as to be able to communicate with the terminal 17, and thus can print an image, a document, and the like based on printing data received from the terminal 17. In addition, the printer is connected to the network 12 so as to be able to communicate with the network, and thus can print a content based on printing data PD transmitted from the server 13.

Meanwhile, each of the transmission apparatus 14 and the terminal 17 is constituted by one of a plurality of terminals connected to the network 12. In the present embodiment, a terminal transmitting a content serves as the transmission apparatus 14, and a terminal receiving a content serves as the terminal 17. In addition, the terminal is not limited to a personal computer, and may be a personal digital assistant (PDA), a tablet PC, a smartphone, a mobile phone, or the like. Accordingly, the network 12 is not limited to a wired network, and may be a wireless network or a wired and wireless network.

As illustrated in FIG. 1, the printer 18 includes a main body 18A having a substantially rectangular parallelepiped shape, a feeding unit 18B which is provided on the back side of the main body 18A so as to be able to set paper P which is an example of a medium, and an operation panel 19 which is provided on one side surface (for example, a front face) of the main body 18A. The operation panel 19 includes an operation unit 19A and a display unit 19B.

The printer 18 of the present embodiment includes a communication port (not shown) capable of communicating with and being connected to a network. In addition, a mail address only for a printer is set in the printer 18. The server 13 has a function of a mail server, and a domain name of the mail address is associated with an IP address of the server 13.

When an e-mail attached with a content CD is transmitted to a mail address destination of the printer 18 from the transmission apparatus 14, the e-mail is received in the server 13. The server 13 acquires the content attached to the e-mail, converts the content into printing data PD, and transmits the printing data PD to the mail address destination of the printer 18 to thereby cause the printer 18 to print the content based on the printing data.

Incidentally, when the printer 18 of a receiver prints a content transmitted from the transmission apparatus 14, the receiver unintentionally consumes printing materials such as the paper P and ink of the printer 18 of the receiver, and thus a printing cost is incurred. On the other hand, a transmitter desires a receiver to print and view a content such as a product or an advertisement. For this reason, the server 13 of the present embodiment performs a point moving process of managing points of a user of a terminal constituted by a receiver and a transmitter and transmitting the price of a printing material consumed by the printing of a content, that is, points compensating for at least a portion of a printing cost from the transmitter to the receiver. Thereby, the receiver can print the content without particularly caring about a printing cost at the time of printing the content using the printer 18, and thus the printing of the content using the printer 18 on the reception apparatus 15 side is promoted, which meets the transmitter's request. Meanwhile, the number of points for compensation is not required to fall within a range of points equivalent to the price of a printing material to be consumed, and may be set to a value exceeding the price so that the content is printed more actively.

In addition, the server 13 widely provides a valuable content CD created by a transmitter or the like to a terminal on the network 12 in response to needs for widely providing a content. The transmitter registers a content in the server 13 from the transmission apparatus 14. The registered content is introduced in a contents list screen 60 (for example, see FIG. 6) which is constituted by a web page provided on the network 12 by the server 13. The server 13 provides the contents list screen 60 in a state where the contents list screen can be accessed by a terminal on the network 12. When the receiver has access to the contents list screen 60 from the terminal 17 and selects a desired content, the server 13 converts the selected content into printing data, and the printing data is transmitted to the printer 18 associated with the terminal 17. Thereby, a transmitter's desired content is printed on the paper P by the printer 18. In this manner, also in the printing of a content which is transmitted to the server 13 and registered by the transmitter, points for compensating for at least a portion of a printing cost are transmitted from the transmitter to the receiver, and thus the transmitter bears the printing cost.

Figure 3:
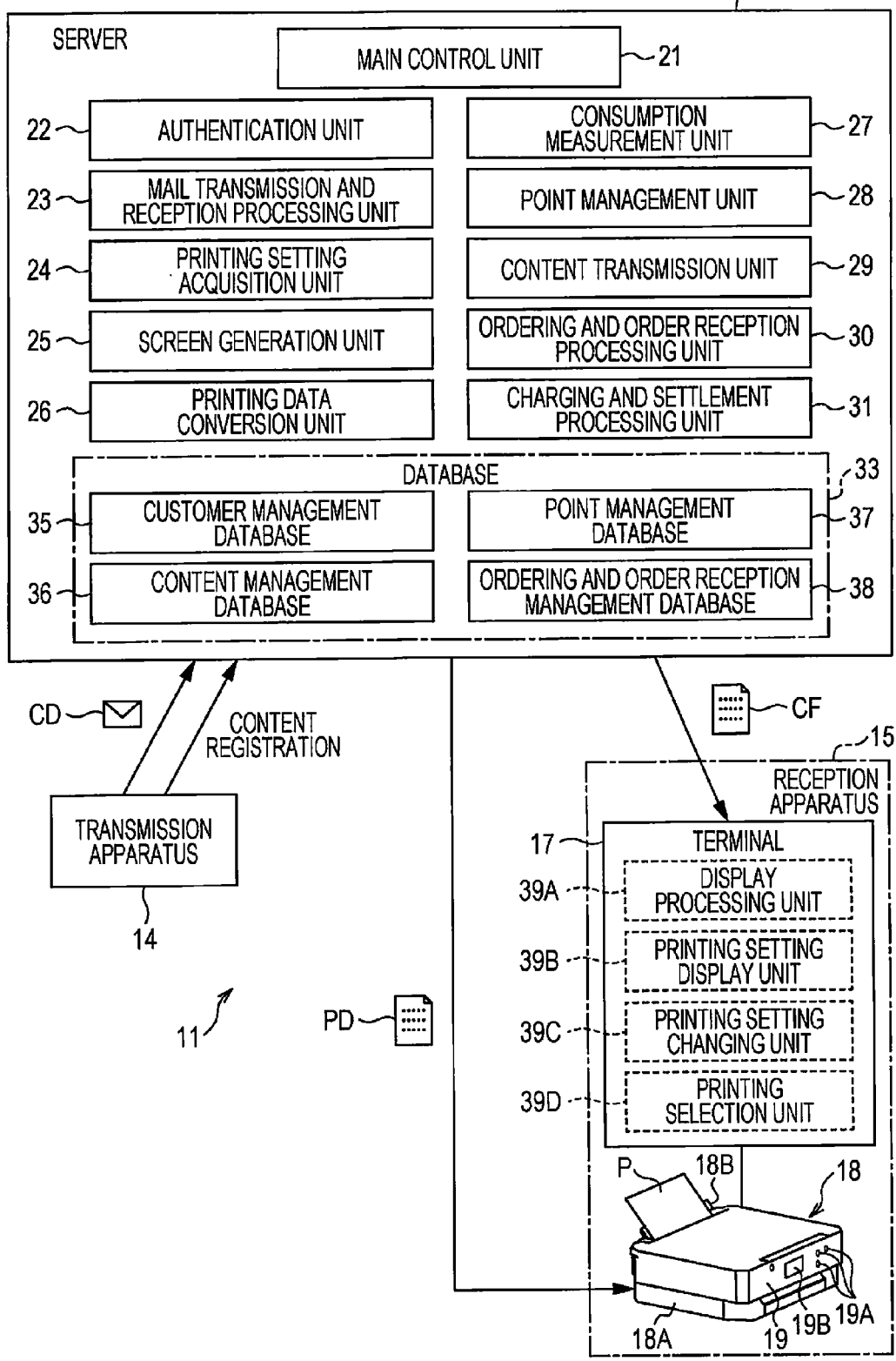
FIG. 3 is a block diagram illustrating a functional configuration of a printing system.

As illustrated in FIG. 3, the server 13 includes a plurality of functional units constructed as software by a computer that executes a program. That is, the server 13 includes a main control unit 21, an authentication unit 22, a mail transmission and reception processing unit 23, a printing setting acquisition unit 24, a screen generation unit 25, a printing data conversion unit 26, a consumption measurement unit 27, a point management unit 28, a content transmission unit 29, an ordering and order receiving processing unit 30, and a charging and settlement processing unit 31. In addition, the server 13 includes a database 33 in order to manage various types of data. The database 33 includes a customer management database 35, a content management database 36, a point management database 37, and an ordering and order receiving management database 38.

Figure 2:
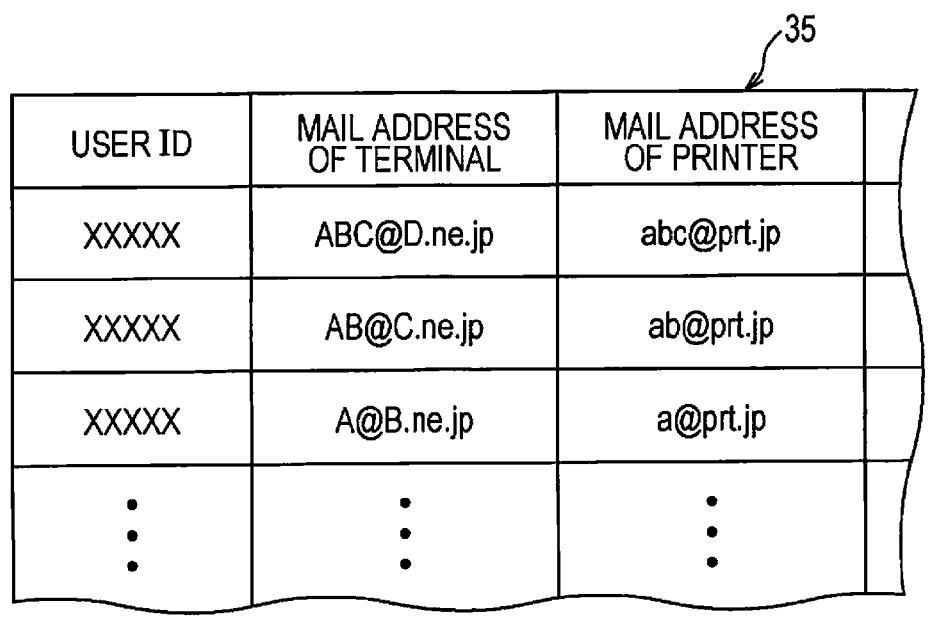
FIG. 2 is a schematic diagram illustrating a customer management DB.

The customer management database 35 (hereinafter, referred to as "customer management DB 35") stores customer information required for a customer (user) to receive a point service. The customer information includes a user ID, a password, a name, a mail address of the terminal 17 of the customer, a mail address of the printer 18 of the customer, and the like. For example, as illustrated in FIG. 2, the customer management DB 35 stores a mail address of the terminal 17 and a mail address of the printer 18 which are associated with each other for each customer (for example, user ID). The mail address of the printer 18 is used as a transmission destination of printing data of a content by the server 13. A domain name of a mail address only for a printer is associated with the IP address of the server 13. An e-mail which is attached with a content and is transmitted to a mail address destination of the printer 18 is transmitted to the server 13 from the transmission apparatus 14.

The content management database 36 (hereinafter, referred to as "content management DB 36") stores a content CD received from the transmission apparatus 14 in association with printing setting information (printing setting data) received together with the content. The printing setting information is printing setting details (printing conditions) designated by a content provider (transmitter) and is transmitted from the transmission apparatus 14 to the server 13 together with contents. In the content management DB 36, a content is also associated with a user ID of a transmitter. Referring to the content management DB 36, it is possible to specify a content provider.

A content is constituted by data (for example, a file) including at least one of an image and a document. Here, the printing setting information includes a paper type, a paper size, a printing color (color/gray scale), a printing mode, the number of printing sheets, and the like. The printing mode includes a low resolution printing mode in which a printing speed is prioritized over a printing quality and a high resolution printing mode in which a printing quality is prioritized over a printing speed.

In the point management database 37 (hereinafter, referred to as "point management DB 37"), the number of points for each user ID are managed. Meanwhile, the points refer to scores that can be used when purchasing a product by changing a portion or the entirety of the price of the product to currency. For example, one point is converted into one currency unit (for example, yen, cent, and won). Meanwhile, a currency conversion value per one point can be appropriately set.

The ordering and order receiving management database 38 (hereinafter, referred to as "ordering and order receiving management DB 38") stores order receiving data and ordering data of products including printing materials (paper, an ink cartridge, and the like) which are sold via the Internet on a product sales screen constituted by a web page provided on the Internet by the server 13 for the purpose of product sales.

The main control unit 21 totally controls the units 22 to 31.

The authentication unit 22 performs a user authentication process on the basis of a user ID, a password, and the like which are input from the terminal 17 by a user with reference to the customer management DB 35. For example, the authentication unit 22 performs a user authentication process on the basis of a user ID and a password which are input when a user logs on to the server 13 from the terminal 17, and thus the terminal 17 can log on to the server 13.

The mail transmission and reception processing unit 23 has a function of transmitting an e-mail attached with a content CD to a mail address destination when receiving the e-mail from the transmission apparatus 14. The content CD is constituted by image data, document data, mixed data including an image and a document, or the like. In other words, the content CD is constituted by data that can be converted into printing data capable of being printed using the printer 18. In addition, the mail transmission and reception processing unit 23 also has a function of transmitting confirmation screen data CF for displaying a printing confirmation screen 40 (see FIG. 4) generated by the screen generation unit 25 on the display unit of the reception apparatus 15 to a mail address destination of the reception apparatus 15.

The printing setting acquisition unit 24 acquires printing setting details designated when the user of the transmission apparatus 14 transmits a content CD to the server 13.

The screen generation unit 25 generates confirmation screen data CF for displaying the printing confirmation screen 40 (refer to FIG. 4) including thumbnail image data of a content CD on the display unit of the reception apparatus 15. At this time, the screen generation unit 25 generates the confirmation screen data CF using information of the printing setting details acquired by the printing setting acquisition unit 24 and information of the number of points acquired by the point management unit 28. Meanwhile, a low resolution image having resolution lower than that of a main image of a content CD may be used instead of a thumbnail image.

Figure 4:
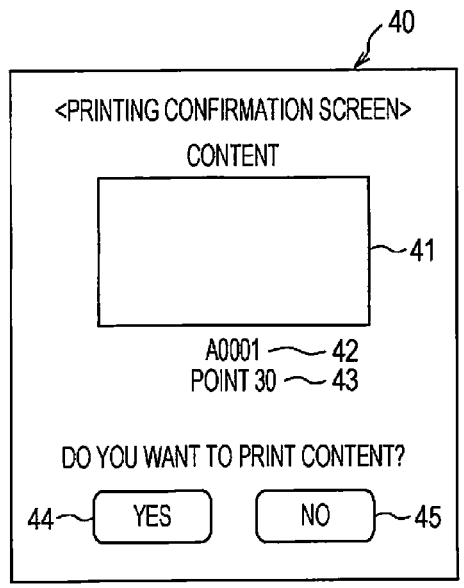
FIG. 4 is a schematic diagram illustrating a printing confirmation screen.

As illustrated in FIG. 4, an image 41 (thumbnail image) of a content, an item 42 indicating an identification number of the content, and an item 43 indicating the number of points that can be obtained when the content is printed are displayed on the printing confirmation screen 40. Further, the printing confirmation screen 40 is provided with a "yes" button 44 and a "no" button 45 for selecting whether or not to print the content.

Figure 5A:
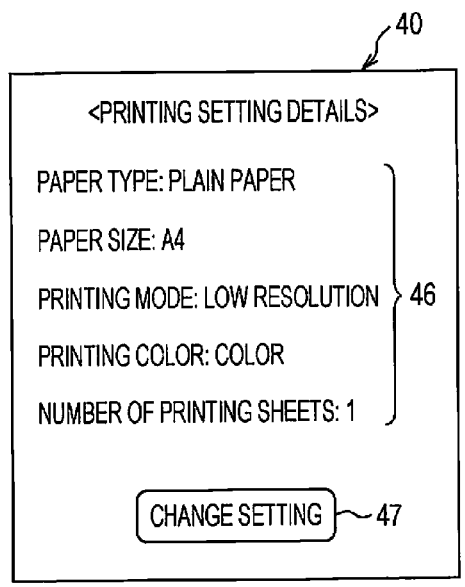
FIG. 5A is a schematic diagram illustrating printing setting details in the printing confirmation screen.
Figure 5B:
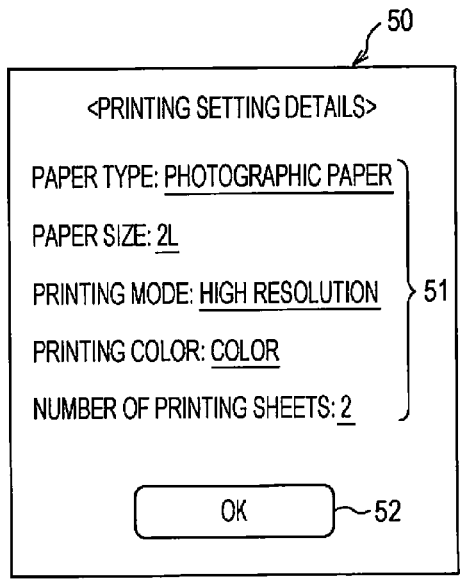
FIG. 5B is a schematic diagram illustrating a printing setting change screen.

In addition, as illustrated in FIG. 5A, the printing confirmation screen 40 includes printing setting details 46 such as a paper type, a paper size, a printing mode, a printing color, and the number of printing sheets, as printing conditions when a content CD is printed. Further, the printing confirmation screen 40 is provided with a setting change button 47 which is selected when changing printing setting details. When a receiver selects the setting change button 47 using an operation unit of the reception apparatus 15, switching to a printing setting change screen 50 illustrated in FIG. 5B is performed. In the printing setting change screen 50, an input mode capable of changing items of printing setting details 51 is set, and thus the printing setting details 51 can be changed using the operation unit of the reception apparatus 15. In the example illustrated in FIGS. 5A and 5B, the printing setting details 46, illustrated in FIG. 5A, in which color printing is performed on one A4-size plain paper sheet in a low resolution printing mode are changed to the printing setting details 51, illustrated in FIG. 5B, in which color printing is performed on two 2 L-size photographic paper sheets in a high resolution printing mode. The changed printing setting details 51 are fixedly set by selecting an OK button 52 in the printing setting change screen 50 illustrated in FIG. 5B. When a content is printed with the fixedly set printing setting details, the "yes" button 44 illustrated in FIG. 4 is selected using the operation unit of the reception apparatus 15.

The printing data conversion unit 26 has a function of converting a content CD attached to an e-mail into printing data in a format capable of being processed by the printer 18.

The consumption measurement unit 27 measures the amount of printing material consumed when the printer 18 prints a content under printing conditions of printing setting details, on the basis of printing data PD converted from a content CD in accordance with the printing setting details. Although ink is used as the printing material, paper (an example of a printing medium) may be used. The consumption measurement unit 27 counts the number of ink dots of each color on the basis of the "printing color" and the "printing mode" in the printing setting details and content data. At this time, when the printing mode is a low resolution printing mode having relatively low dot resolution, the ink consumption becomes relatively smaller. On the other hand, when the printing mode is a high resolution printing mode having relatively high dot resolution, the ink consumption becomes relatively larger. In addition, when paper (an example of a printing medium) is used as the printing material, the consumption of paper is computed (measured) on the basis of the "paper type" and the "paper size" in the printing setting details. The consumption of paper is estimated as a price of paper consumption by multiplying a paper area determined from the paper area by a price per unit area according to the paper type.

The point management unit 28 manages points for each user in the point management DB, and performs a point moving process of moving points between the user of the transmission apparatus 14 and the user of the reception apparatus 15. The point moving process includes a process of moving points according to the consumption of a printing material from the user of the transmission apparatus 14 to the user of the reception apparatus 15 for the purpose of compensating for a printing cost of a content and a process of moving points from the user of the reception apparatus 15 to the user of the transmission apparatus 14 in order to pay a charge for printing of a valuable content using the points. For this reason, in the former case, the user of the reception apparatus 15 can obtain a point, and thus the printing of a content which is desired to be printed by the user of the transmission apparatus 14 is promoted, while in the latter case, it is possible to acquire printed matter of a desired content by paying points by the user of the reception apparatus 15.

In the former case, the point management unit 28 performs a point moving process of moving points of a value according to the printing setting details of a content CD. The point management unit 28 in this example moves the number of points according to a printing cost by subtracting the number of points according to the consumption of a printing material which is measured by the consumption measurement unit 27 on the basis of the printing setting details and data of the content CD from points of the user of the transmission apparatus 14 and by adding the number of points to points of the user of the reception apparatus 15.

Here, the point management unit 28 acquires the number of points to be displayed on the item 43 of the printing confirmation screen 40 and transmits the acquired number of points to the screen generation unit 25. In addition, when an input for changing printing setting is received in the screen 50 of FIG. 5B, the point management unit 28 transmits the number of points which is acquired on the basis of data of the changed printing setting details to the screen generation unit 25. At this time, the point management unit 28 acquires the number of points when a content CD is printed with the printing setting details, from at least ink consumption between the ink consumption measured by the consumption measurement unit 27 and the consumption of paper P.

The screen generation unit 25 transmits printing confirmation screen data generated on the basis of data of the changed printing setting details to the reception apparatus 15, and thus the changed printing confirmation screen 40 is displayed on the display unit of the reception apparatus 15. In the changed printing confirmation screen 40, the changed number of points is displayed on the item 43.

The content transmission unit 29 performs a process of transmitting screen data generated by the screen generation unit 25 to the reception apparatus 15 and a process of transmitting printing data PD converted from the content CD by the printing data conversion unit 26 to a mail address destination of the reception apparatus 15 (in detail, the printer 18). In addition, the content transmission unit 29 provides a web page of the contents list screen 60 illustrated in FIG. 6 to a terminal on the network 12. As illustrated in FIG. 6, a list of images 61 (thumbnail images) of contents is displayed on the contents list screen 60, and an identification number and the number of points are displayed for each image 61. The number of points includes a positive number and a negative number. When the number of points is a positive number, the number of points is added to points owned by a user whenever one image 61 is printed. When the number of points is a negative number, the number of points is subtracted from points owned by a user whenever one image 61 is printed. When the user selects one image 61 from the contents list screen 60 displayed on the display unit of the reception apparatus 15 and performs an operation of selecting an OK button in a printing confirmation screen to be displayed next (both are not shown in the drawing), an image selection signal based on the operation is transmitted from the reception apparatus 15 to the server 13.

When the content transmission unit 29 receives the image selection signal from the reception apparatus 15, the content transmission unit requests that the printing data conversion unit 26 converts a selected content CD into printing data PD. Then, the content transmission unit 29 transmits the printing data PD converted from the selected content CD, read out from the content management DB 36, by the printing data conversion unit 26 to a mail address destination of the reception apparatus 15. In this manner, when the printing data PD is transmitted to the reception apparatus 15, the printing data is transmitted to a mail address destination of the printer 18. Meanwhile, the printing data PD may be transmitted to a mail address destination of the terminal 17, or may be transmitted from the terminal 17 to the printer 18.

The ordering and order receiving processing unit 30 performs a process of receiving an order of a product purchased on a product sales screen (not shown) provided on the network 12 by the server 13 for the purpose of selling products and a process of ordering a product, and stores the order receiving data and ordering data thereof in the ordering and order receiving management DB 38 and manages the pieces of data.

The charging and settlement processing unit 31 performs a process of charging for a product sold on the Internet and a process of paying for the product. When the settlement is performed, a user can pay a portion or the entirety of a charge by points in a settlement screen under an authenticated state where the user logs on to the server 13 from the terminal 17.

In addition, as illustrated in FIG. 3, the terminal 17 includes a plurality of functional units that are constructed as software by a computer that executes a program. That is, the terminal 17 includes a display processing unit 39A, a printing setting display unit 39B, a printing setting change unit 39C, and a printing selection unit 39D.

The display processing unit 39A displays details of a content CD on a display unit 17B. In this example, the image 41 of the content CD is displayed on a display unit 17B by displaying the printing confirmation screen 40 (see FIG. 4). The image 41 is constituted by, for example, a thumbnail image.

The printing setting display unit 39B displays printing setting details on the display unit 17B on the basis of printing setting information. In this example, the printing setting details 46 of a content CD are displayed on the display unit 17B by displaying the printing confirmation screen 40 (see FIG. 5A).

The printing setting change unit 39C has a function of changing the printing setting details 51 (see FIG. 5B) displayed on the display unit 17B by using the operation unit 17A. The printing setting change unit 39C in this example changes the printing setting details 51 in accordance with operation details of the operation unit 17A which is operated under an input mode in which the printing setting change screen 50 (see FIG. 5B) is displayed.

The printing selection unit 39D performs a process of selecting whether or not to print a content CD. In this example, the printing selection unit 39D selects whether or not to print the content CD by receiving a user's input of selecting either one of the buttons 44 and 45 provided in the printing confirmation screen 40 (see FIG. 5A) by using the operation unit 17A.

In addition, it is also possible to use a dedicated application (program) downloaded to the terminal 17, for example, from the server 13 instead of using a method of using a program included in confirmation screen data CF received from the server 13. In this case, the display processing unit 39A, the printing setting display unit 39B, the printing setting change unit 39C, and the printing selection unit 39D which are included in the terminal 17 are constituted by a CPU (not shown) that executes a dedicated application program.

In addition, when the reception apparatus 15 is constituted by the single printer 18 (see FIG. 1), the server 13 transmits the confirmation screen data CF to the printer 18 through the network 12. A display processing unit 39A, a printing setting display unit 39B, a printing setting change unit 39C, and a printing selection unit 39D, which are the same as those in the terminal 17, are constructed within the printer 18 by a CPU (not shown) within the printer 18 which executes a program included in the confirmation screen data CF received from the server 13. Accordingly, the printing confirmation screen 40 (FIG. 4) is displayed on the display unit 19B of the printer 18, and thus it is possible to confirm the image 41 (thumbnail image) of a content and the printing setting details 46 (FIG. 5A). In addition, when the printing setting details 46 are desired to be changed, it is possible to perform switching to the printing setting change screen 50 illustrated in FIG. 5B by operating the setting change button 47 (FIG. 5A) using the operation unit 19A and to change desired items. Then, when the "yes" button 44 is selected in the printing confirmation screen 40 using the operation unit 19A, printing setting change information and a printing request notification are transmitted to the server 13 through the network 12 from the printer 18.

Next, a point moving process will be described with reference to FIGS. 7A to 8B. It is assumed that a transmitter having a user ID of "a0001" owns the number of points "A", and a receiver having a user ID of "b0001" owns the number of points "B". The server 13 assumes that the printing of a content CD has been performed on the reception apparatus 15 side by the transmission of printing data, converted from the content CD attached to an e-mail which is received from the transmission apparatus 14, to the printer 18. In this manner, as illustrated in FIG. 7A, the point management unit 28 moves the number of points "C" capable of being obtained on condition that a content is printed, from A points of the transmitter having the user ID of "a0001" to B points of the receiver having the user ID of "b0001", on condition that a content CD is printed on the reception apparatus 15 side. As a result, as illustrated in FIG. 7B, the number of points of the transmitter is set to be "A-C", and the number of points of the receiver is set to be "B+C". In this manner, since points can be obtained when a content CD is printed, the receiver's printing of the content CD is promoted.

In addition, the receiver has access to the server 13 from the terminal 17 to thereby display the contents list screen 60 on the display unit 17B. When the receiver selects a desired image 61 (content) for which point payment is required in the contents list screen 60, the server 13 converts the selected content into printing data and transmits the converted printing data to the printer 18 of the receiver. The server 13 assumes that the content has been performed by the transmission of the printing data. In this manner, as illustrated in FIG. 8A, the point management unit 28 moves the number of points "D" paid for the printing of a content from B points of the receiver having the user ID of "b0001" to A points of the transmitter having the user ID of "a0001", on condition that the content has been printed by the printer 18 of the receiver. As a result, as illustrated in FIG. 8B, the number of points of the receiver is reduced by D points and thus is set to be "B-D", and the number of points of the transmitter is increased by D points and thus is set to be "A+D". In this manner, the receiver can print a desired content using points.

Next, the action of the printing system 11 will be described with reference to FIG. 9.

A transmitter creates a content CD using an image of a picture captured by the digital camera 16, or the like. The transmitter sets desired printing setting details which are desired to be printed by a receiver by using, for example, a dedicated application to thereby create, for example, one file or one folder in which printing setting information is added to a content CD or two files of a content CD and printing setting information. The transmitter transmits an e-mail to which the content CD having printing setting information added thereto is attached, to a mail address destination of the printer 18 of one receiver or each of a plurality of receivers.

Figure 9:
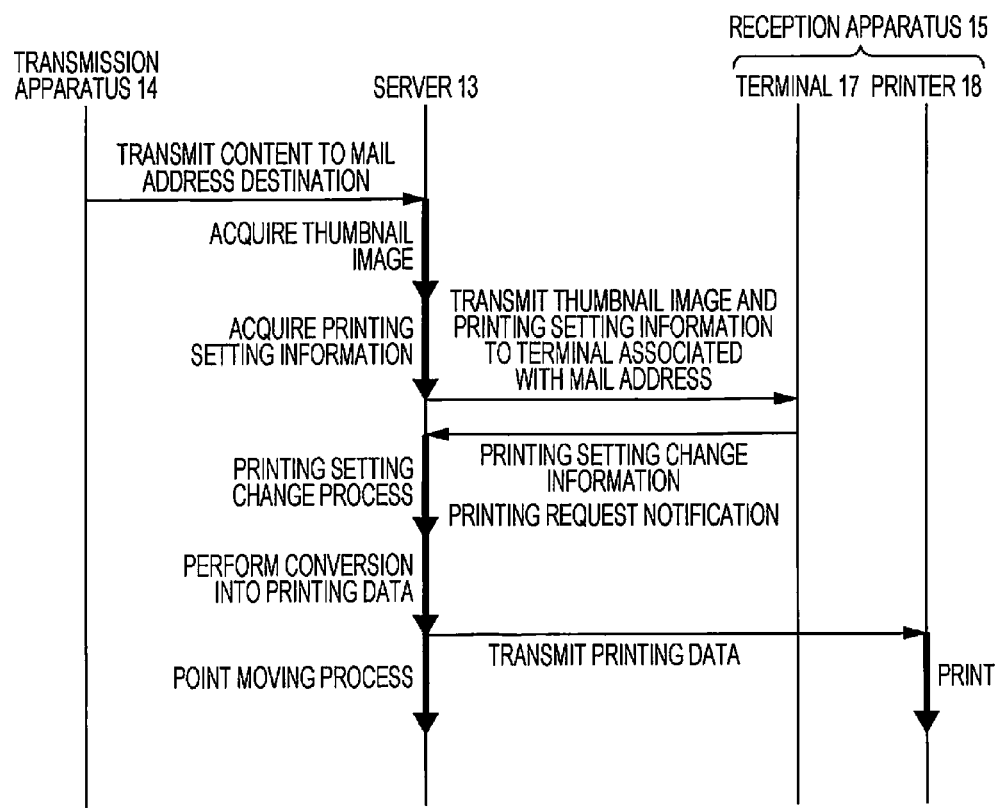
FIG. 9 is a sequence diagram illustrating the action of the printing system.

As illustrated in FIG. 9, a content CD is transmitted to a mail address destination of the printer 18 of a receiver from the transmission apparatus 14 (terminal) by being attached to an e-mail. The e-mail is received in the server 13 having a function of a mail server which is specified in a domain of the mail address. The server 13 acquires a thumbnail image from the content CD attached to the e-mail, and then acquires printing setting information added to the content CD.

The server 13 acquires a mail address of the terminal 17 associated with a terminal 17 with reference to the customer management DB 35. The server transmits a thumbnail image and printing setting information to a mail address destination of the terminal 17. In this example, the screen generation unit 25 of the server 13 generates confirmation screen data CF (an example of display data) for displaying the printing confirmation screen 40 illustrated in FIG. 4 which includes the thumbnail image and the printing setting information on the terminal 17. The thumbnail image and the printing setting information are transmitted to the mail address destination of the terminal 17 in the form of an e-mail including the confirmation screen data CF. The transmission is performed by the mail transmission and reception processing unit 23.

In the terminal 17, the printing confirmation screen 40, illustrated in FIG. 4, based on the confirmation screen data CF is displayed on the display unit 17B when an e-mail received from the server 13 is opened. A receiver confirms details of a content CD by viewing the image 41 (thumbnail image) of the printing confirmation screen 40, the number of points capable of being obtained on condition that the content CD is printed, and the like. Further, the receiver confirms the printing setting details 46 illustrated in FIG. 5A which are shown on, for example, the next page of the printing confirmation screen 40.

When the printing setting details 46 are desired to be changed in printing a content, the setting change button 47 in the printing confirmation screen 40 is selected using the operation unit 17A. Then, the display details of the display unit 17B are switched to the printing setting change screen 50 illustrated in FIG. 5B, and thus desired items in the printing setting details 51 are changed by operating the operation unit 17A in the printing setting change screen 50. In the example illustrated in FIGS. 5A and 5B, the paper type is changed from "plain paper" to "photographic paper", the paper size is changed from "A4 size" to "2 L size", the printing mode is changed from "low resolution printing mode" to "high resolution printing mode", and the number of printing sheets is changed from "one sheet" to "two sheets".

When the OK button 52 in the printing setting change screen 50 is selected using the operation unit 17A after the change in printing setting details is terminated, the changed printing setting details are fixedly set and return to the printing confirmation screen 40 illustrated in FIG. 4. At this time, printing setting information changed may be transmitted to the server 13 when the OK button 52 is operated, the point management unit 28 may count the number of points again on the basis of a value remeasured by the consumption measurement unit 27 of the server 13 on the basis of the changed printing setting information, and the changed confirmation screen data CF including the recounted number of points may be transmitted to the reception apparatus 15. In this case, the receiver can confirm the number of points based on the changed printing setting information in the changed printing confirmation screen 40 displayed on the display unit of the reception apparatus 15.

Then, it is possible to select whether or not to print a content CD by selecting the button 44 or the button 45. A selection result notification based on the selection of the button 44 or the button 45 is transmitted to the server 13. The receiver selects the "yes" button 44 in the printing confirmation screen 40 using the operation unit 17A. Then, a printing request notification is transmitted to the server 13 from the terminal 17 of the reception apparatus 15, as the selection result notification. At this time, printing setting change information is also transmitted to the server 13 from the terminal 17. On the other hand, when a content CD is not printed, the receiver selects the "no" button 45 using the operation unit 17A. In this case, a non-printing notification is transmitted to the server 13 from the terminal 17 of the reception apparatus 15, as the selection result notification.

When the server 13 receives the printing request notification, the server determines whether or not printing setting change has been performed, on the basis of the printing setting information. When the printing setting change is present, the server performs a printing setting change process. Then, the printing data conversion unit 26 of the server 13 converts a content CD into printing data PD on the basis of the printing setting information. The printing data conversion unit 26 generates printing data PD by performing well-known processing such as, for example, resolution conversion, color conversion, and half-toning on the content CD in accordance with the printing setting information.

The content transmission unit 29 of the server 13 transmits the printing data PD to a mail address destination of the printer 18 of the reception apparatus 15. As a result, the printer 18 prints a content on paper P by controlling a printing engine on the basis of the received printing data PD. On the other hand, when the server 13 receives a non-printing notification from the reception apparatus 15, the server does not perform the conversion of a content into printing data and the transmission of printing data to the reception apparatus 15. Meanwhile, a process of transmitting a content to a mail address destination by the transmission apparatus 14 and receiving printing data of the content by the reception apparatus 15 is equivalent to an example of a transmission step. In addition, a process of printing a content on the printer 18 by performing printing control on the basis of the printing data received in the reception apparatus 15 is equivalent to an example of a printing step.

In the server 13, the point management unit 28 assumes that a content has been printed in the reception apparatus 15 by the transmission of the printing data, and thus performs a point moving process of moving points according to the printing of the content from the user of the transmission apparatus 14 to the user of the reception apparatus 15. When the printing setting details are changed, the point management unit 28 moves points of a value according to the changed printing setting information. In other words, the point management unit 28 changes the number of points to be moved in the point moving process in accordance with the changed printing setting information.

For example, as illustrated in FIG. 7A, the point management unit 28 moves C points capable of being obtained by the printing of a content from A points of the transmitter having the user ID of "a0001" to B points of the receiver having the user ID of "b0001". In other words, the point management unit 28 adds the C points subtracted from A points of the transmitter, to B points of the receiver. As a result, the points of the transmitter and the receiver are set to be "A−C" and "B+C", respectively, as illustrated in FIG. 7B. In this manner, the C points capable of being obtained on condition that a content is printed are moved from A points owned by the content provider to B points owned by the receiver. Meanwhile, as in the example illustrated in FIG. 5B, when the number of printing sheets is increased, a predetermined number of points is moved every time one sheet is printed, up to a predetermined upper limit number of sheets.

In addition, the receiver logs on to the server 13 from the terminal 17 to thereby display the contents list screen 60 illustrated in FIG. 6 on the display unit 17B. When a desired content (image 61) is desired to be detected in the contents list screen 60 and to be printed, the desired content is selected using the operation unit 17A. Then, since a printing confirmation screen (not shown) is displayed on the display unit 17B, printing setting details are changed when necessary by operating the operation unit 17A. The server 13 convers the selected content CD into printing data PD in accordance with the printing setting details and transmits the printing data PD to the receiver's printer 18.

The server 13 assumes that a content has been printed by the transmission of the printing data, and the point management unit 28 performs a point moving process. In this case, when the number of points of a content is a positive number, the point management unit 28 moves C points capable of being obtained by printing a content from A points of the transmitter having the user ID of "a0001" to B points of the receiver having the user ID of "b0001", for example, as illustrated in FIGS. 7A and 7B. On the other hand, when the number of points of a content is a negative number, the point management unit 28 moves D points paid for the printing of a content from B points of the receiver having the user ID of "b0001" to A points of the transmitter having the user ID of "a0001", for example, as illustrated in FIG. 8A. In other words, the point management unit 28 adds the D points subtracted from B points of the receiver, to A points of the transmitter. As a result, the points of the transmitter and the receiver are set to be "A+D" and "B−D", respectively, as illustrated in FIG. 8B. In this manner, the D points paid for the printing of a desired content are moved from B points owned by the receiver to A points owned by the content provider. Meanwhile, as in the example illustrated in FIG. 5B, when the number of printing sheets is increased, a predetermined number of points is moved every time one sheet is printed, up to a predetermined upper limit number of sheets.

In addition, when the reception apparatus 15 is constituted by the single printer 18, a thumbnail image and printing setting information are transmitted to the printer 18 with a mail address destination only for a printer from the server 13 in FIG. 9. Thereafter, the printing confirmation screen 40 and the printing setting change screen 50 are displayed on the display unit 19B of the printer 18 instead of the display unit 19B of the terminal 17. For this reason, the image 41 of a content CD, the number of points, printing setting details, and the like are confirmed in the display unit 19B of the printer 18, and the printing setting details are changed by operating the setting change button 47 when necessary. When a content CD is printed, the "yes" button 44 is selected using the operation unit 19A. In this manner, it is possible to instruct the printing of the content CD after the confirmation of details of the content CD, the confirmation of the printing setting details, and printing setting change are also performed using the printer 18. Meanwhile, a process of moving points according to the printing of a content transmitted to the mail address destination of the reception apparatus 15 from the transmission apparatus 14 or a content selected from a list of contents (FIG. 6) transmitted from the transmission apparatus 14 and registered in the server 13 from the user of the transmission apparatus 14 to the user of the reception apparatus 15 is equivalent to a point processing step.

According to the present embodiment mentioned above in detail, it is possible to obtain the following effects.

(1) The printing system 11 includes the transmission apparatus 14 that transmits a content CD to be printed, the reception apparatus 15 that performs printing control of a content CD, and the server 13 that manages points for using a service for each of users including a user (transmitter) of the transmission apparatus 14 and a user (receiver) of the reception apparatus 15. The server 13 performs a process of moving points according to the printing of a content CD from the user of the transmission apparatus 14 to the user of the reception apparatus 15. In this manner, the points according to the printing of the content CD are moved from the user of the transmission apparatus 14 to the user of the reception apparatus 15, and the user of the transmission apparatus 14 bears a printing cost using the points. Accordingly, the user of the reception apparatus 15 can print the content CD without particularly caring about the printing cost incurred due to the consumption of a printing material. As a result, the printing of the content CD which is performed by the user of the reception apparatus 15 is promoted.

(2) The server 13 moves points according to the consumption of a printing material such as paper P or ink which is used to print a content CD from the user of the transmission apparatus 14 to the user of the reception apparatus 15. Accordingly, since the user of the reception apparatus 15 can obtain an appropriate number of points according to the consumption of the printing material, it is possible to print the content CD without particularly caring about the consumption of the printing material.

(3) The server 13 displays the image 41 of a content CD on the display unit (the display unit 17B of the terminal 17 or the display unit 19B of the printer 18) of the reception apparatus 15. For this reason, even when a receiver cannot confirm the content on the display unit because the content is transmitted in a format of printing data at the time of performing printing, the receiver can confirm details of the content CD by the image 41 (thumbnail image) in a format capable of being displayed on the display unit. When the content CD is printed, the reception apparatus 15 transmits a printing request notification to the server 13 when the receiver selects the "yes" button 44 using the operation unit 19A, and the server 13 transmits printing data of the content CD to the reception apparatus 15 in response to the notification. Accordingly, since the receiver can select whether or not to print the content CD after confirming the details of the content CD on the display unit of the reception apparatus 15, it is possible to prevent an unnecessary content CD from being printed. In addition, since the receiver can confirm the number of points on the display unit of the reception apparatus 15, it is possible to prevent an unnecessary content from being printed even if the receiver can acquire points.

(4) The server 13 moves points of a value according to printing setting details of a content CD. Accordingly, it is possible to move points of a value according to the amount (consumption) of printing material (for example, a printing medium and ink) used to print the content CD. Therefore, it is possible to print the content CD without particularly caring about the consumption of a printing material. Particularly, in this example, the ink consumption when the content CD is printed is measured by the consumption measurement unit 27 on the basis of data of the content CD, and the point management unit 28 counts the number of points on the basis of the measured ink consumption. In addition, when the consumption measurement unit 27 measures the consumption of paper P in accordance with a paper type and a paper size which are pieces of printing setting information, the point management unit 28 acquires the number of points on the basis of the ink consumption and the paper consumption. Accordingly, it is possible to move points of an appropriate value according to a printing material, which is actually consumed at the time of printing a content, to a receiver.

(5) The server 13 transmits the printing setting details 46 of a content CD to the reception apparatus 15, and the reception apparatus 15 includes the printing setting change unit 39C capable of changing the printing setting details 51. Accordingly, a receiver can confirm the printing setting details of the content CD on the display unit of the reception apparatus 15. When the receiver desires to change the printing setting details, the receiver changes the printing setting details by operating the operation unit 17A in an input mode in which the printing setting change screen 50 is displayed, and thus can print the content CD with the changed printing setting details. When the point management unit 28 of the server 13 receives data of the changed printing setting details 51 from the reception apparatus 15, the point management unit moves points of a value according to the changed printing setting details 51. At this time, points of a value according to the changed printing setting details are moved. Accordingly, even when the printing setting details are changed, it is possible to print the content CD without particularly caring about a printing material (for example, a printing medium and ink). In addition, when a configuration is adopted in which when the receiver can confirm points after the change in printing setting details on the printing confirmation screen 40, it is possible to determine whether or not to print the content CD by confirming the number of points capable of being acquired.

(6) The server 13 converts a content CD into printing data PD and transmits the printing data to the reception apparatus 15. Accordingly, even when the reception apparatus 15 does not perform a process of converting the content CD into printing data, it is possible to print the content CD. In addition, when the content CD is transmitted in a data format capable of being displayed on the display unit, it is possible to prevent the content CD from being used for purposes different from transmitter's intention instead of being used only for display using a viewer or the like without being printed.

(7) The reception apparatus 15 includes the display processing unit 39A for displaying the image 41 of a content and the number of points, and the printing selection unit 39D capable of selecting whether or not to print a content CD. Accordingly, the user of the reception apparatus 15 can select whether or not to print the content CD after confirming the image 41 of the content and the number of points, and thus it is possible to prevent an unnecessary content CD from being printed.

(8) The reception apparatus 15 includes the printing setting display unit 39B for displaying the printing setting details 46 of a content CD, the display processing unit 39A for displaying the number of points and the like, the printing setting change unit 39C for changing the printing setting details, and the printing selection unit 39D capable of selecting whether or not to print a content CD. Therefore, the user of the reception apparatus 15 can select whether or not to print a content CD after confirming the printing setting details of the content CD and the number of points on a display unit and changing the printing setting details when necessary by operating the operation unit 17A or 19A. Accordingly, it is possible to print a content CD by changing the printing setting details to desired printing setting details and to prevent an unnecessary content CD from being printed. In addition, when the printing setting details are changed, the number of points capable of being obtained in accordance with the changed printing setting details is changed, and thus it is possible to print a content without particularly caring about the consumption of a printing material due to the printing of the content.

(9) When the reception apparatus 15 is constituted by the terminal 17 and the printer 18, the reception apparatus transmits confirmation screen data CF to a mail address destination of the terminal 17 which is associated with a mail address only for a printer which serves as a destination of an e-mail received from the transmission apparatus 14. Accordingly, when the printing of a content CD is selected using the operation unit 17A of the terminal 17 after the image 41 of a content, printing setting details, the number of points, and the like are confirmed on the display unit 17B of the terminal 17, it is possible to cause the printer 18 to print the content CD. In addition, when the reception apparatus 15 is constituted by the single printer 18, the selection of the printing of a content CD using the operation unit 19A after confirming the image 41 of a content, printing setting details, the number of points, and the like on the display unit 19B of the printer 18 can allow the printer 18 to print the content CD.

Second Embodiment

Figure 10:
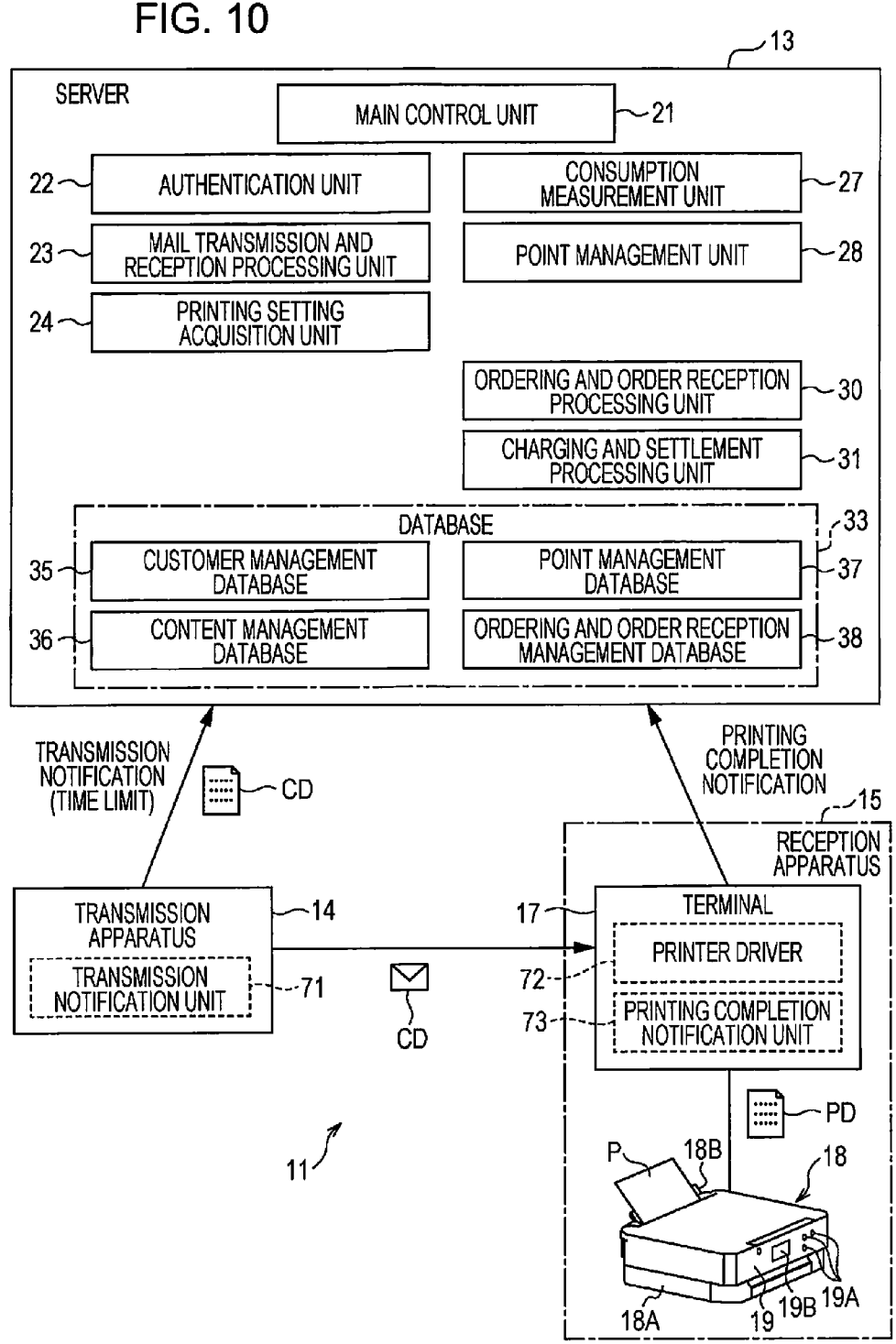
FIG. 10 is a block diagram illustrating a functional configuration of a printing system according to a second embodiment.

Next, a second embodiment will be described with reference to FIGS. 10 and 11. In the present embodiment, as illustrated FIG. 10, a content CD is transmitted to a reception apparatus 15 from a transmission apparatus 14 through a network 12 without passing through a server 13. In order for the server 13 to perform a point moving process, it is necessary to transmit a transmission notification indicating that a content CD is transmitted to the reception apparatus 15 from the transmission apparatus 14, to the server 13. For this reason, the transmission apparatus 14 of this example includes a transmission notification unit 71. In addition, since the reception apparatus 15 is required to convert a content CD into printing data in order for a printer 18 to print the content, a terminal 17 in the example illustrated in FIG. 10 includes a printer driver 72. In addition, since a printing completion notification indicating that the printing of a content CD using the printer 18 has been completed is required to be transmitted to the server 13 from the terminal 17 in order for the server 13 to perform a point moving process, the terminal 17 includes a printing completion notification unit 73. A content CD received by the terminal 17 is converted into printing data PD by the printer driver 72, and the converted printing data PD is transmitted to the printer 18 from the terminal 17.

On the other hand, when the reception apparatus 15 is constituted by the single printer 18, the printer 18 includes a printer driver and a printing completion notification unit (both are not shown in the drawing). The printer driver converts a content CD into printing data PD similar to the configuration of the terminal 17. The printing completion notification unit transmits a printing completion notification indicating that the printing of a content CD has been completed, to the server 13. Meanwhile, the transmission notification unit 71 is constructed within the transmission apparatus 14 by the transmission apparatus downloading a dedicated application from the server 13. The dedicated application for a transmitter has a function of creating a content CD with the term of validity and printing frequency limitation by inputting and setting the term of validity and the number of printings using an operation unit. For this reason, a content CD transmitted from the transmission apparatus 14 to the reception apparatus 15 is transmitted to the reception apparatus 15 with the term of validity and printing frequency limitation. Transmission information including transmitter specific information capable of specifying a transmitter, the term of validity, a limited number of printings, and receiver specific information such as a receiver's mail address which is capable of specifying a receiver is added to a transmission notification transmitted from the transmission apparatus 14 to the server 13.

In addition, the printer driver 72 and the printing completion notification unit 73 are constructed within the reception apparatus 15 by the reception apparatus downloading a dedicated application from the server 13. The dedicated application has a function of permitting the display of a content CD with the term of validity on a display unit 17B or 19B. Details of the content CD are displayed on the display unit 17B or 19B, and thus a receiver can confirm the details of the content CD. At this time, the details of the content CD are displayed using a thumbnail image in a manner similar to the first embodiment.

The server 13 receives a transmission notification from the transmission apparatus 14 and a printing completion notification from the reception apparatus 15. When a main control unit 21 receives the transmission notification, the main control unit acquires transmitter specific information, the term of validity of a content, a limited number of printings, and receiver specific information such as a receiver's mail address which are added to the transmission notification, and manages the acquired various pieces of information in a database 33. When the main control unit 21 receives the printing completion notification using a mail address specified from the receiver specific information as a transmission source, the main control unit instructs a point management unit 28 to perform a point moving process if the corresponding term of validity of a content and limited number of printings are satisfied. The point management unit 28 performs the point moving process illustrated in FIGS. 7A and 7B in the first embodiment when an instruction is received from the main control unit 21. Meanwhile, the server 13 of the present embodiment does not include a screen generation unit 25, a printing data conversion unit 26, and a content transmission unit 29 in the first embodiment. In addition, the mail transmission and reception processing unit 23 does not have a function of a mail server and is used for the purpose of notifying a user's terminal of user's point information.

Next, the action of a printing system 11 of the present embodiment will be described with reference to FIG. 11.

Figure 11:
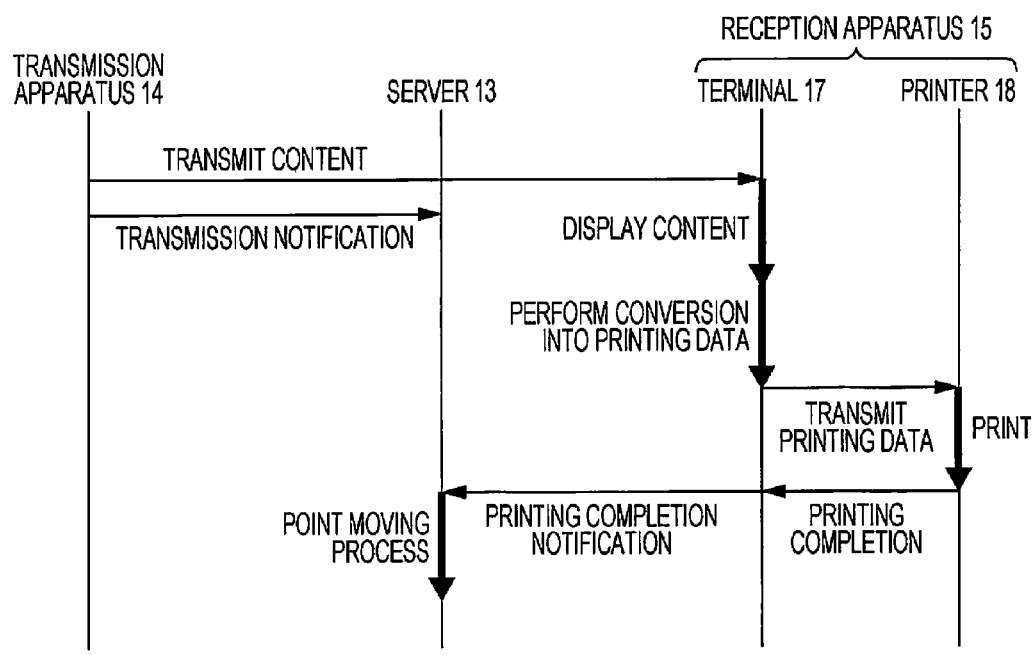
FIG. 11 is a sequence diagram illustrating the action of the printing system.

As illustrated in FIG. 11, a content CD is transmitted to the reception apparatus 15 from the transmission apparatus 14. In this example, the content CD is transmitted to the terminal 17 constituting the reception apparatus 15. In other words, a transmitter transmits a content CD with the term of validity and a limited number of printings to a mail address destination of the terminal 17. In this case, a domain name of the mail address is not required to be associated with an IP address of the server 13.

A process of transmitting the content CD with the term of validity and a limited number of printings is performed using a dedicated application. A transmitter performs an operation of selecting a content CD and transmitting the content CD after inputting the term of validity and a limited number of printings, using an operation unit in a state where a transmission screen is displayed on a display unit of the transmission apparatus 14 (for example, a PC) (both the operation unit and the operation unit are not shown in the drawing). Then, a dedicated application executed by a CPU within the transmission apparatus 14 generates a content CD with the term of validity and a limited number of printings, and transmits the content CD to a designated mail address destination. As a result, the content CD is transmitted to the terminal 17.

When the transmission apparatus 14 transmits a content CD, the transmission notification unit 71 constituted by a dedicated application similarly transmits a transmission notification indicating that the content CD has been transmitted, to the server 13. For this reason, the transmission notification unit transmits a transmission notification having transmitter specific information, reception destination specific information capable of specifying the terminal 17 which is a reception destination, and transmission information including the term of validity and a limited number of printings being added thereto, to the server 13. The transmitter specific information and the reception destination specific information include, for example, a mail address, an IP address, a user ID, and the like. The transmitter specific information and the reception destination specific information may be information which is used when the server 13 can specify a user (receiver) of a reception destination with reference to a customer management DB 35 at the time of performing a point moving process. In addition, the transmission apparatus 14 also transmits a content CD when transmitting a transmission notification to the server 13. This is because the consumption measurement unit 27 uses data of the content CD to measure ink consumption. The content CD is managed in a content management DB 36.

When the terminal 17 of the reception apparatus 15 receives a content CD, the terminal displays the content CD on the display unit 17B and confirms the image thereof. The terminal 17 displays details (thumbnail image) of a content CD on the display unit 17B using a dedicated application. A receiver can confirm the details of the content CD on the display unit 17B, and a button (see FIG. 4), similar to the first embodiment in the display unit 17B, capable of selecting whether or not to print a content using an operation unit 17A is displayed on the display unit 17B, and thus a receiver desiring to print the content CD selects whether or not to perform printing using the operation unit 17A. Then, the printer driver 72 converts the content CD into printing data. Then, the printing data is transmitted to the printer 18 from the terminal 17. The printer 18 having received the printing data prints a content based on the printing data on paper P. When the printer 18 completes printing, the printing completion notification unit 73 of the terminal 17 transmits a printing completion notification having printing completion information, including receiver specific information, content information, and transmitter specific information, being added thereto to the server 13.

When the main control unit 21 of the server 13 receives a printing completion notification, the main control unit instructs the point management unit 28 to perform a point moving process. In other words, the point management unit 28 performs a point moving process when the server 13 receives the printing completion notification. At this time, the point management unit 28 specifies a combination of a transmitter and a receiver which have transmitted specific information and received specific information coinciding with each other by collating the transmission information added to the transmission notification with printing completion information received from the terminal 17 to thereby perform a point moving process of moving predetermined points from the transmitter's point to the receiver's point. That is, as illustrated in FIG. 7A, the point management unit 28 moves the number of points "C" capable of being obtained on condition that a content is printed from A points of a transmitter having a user ID of "a0001" to B points of a receiver having a user ID of "b0001". As a result, as illustrated in FIG. 7B, the number of points of the transmitter is set to be "A−C", and the number of points of the receiver is set to be "B+C". In this manner, since it is possible to obtain points when a content CD is printed, the receiver's printing of the content CD is promoted.

Meanwhile, when the reception apparatus 15 is constituted by the single printer 18, a transmission destination of a content CD from the transmission apparatus 14 is set to be a mail address of the printer 18 instead of a mail address of the terminal 17 in FIG. 11. The printer 18 performs the display of a received content CD received by the printer 18 on the display unit 19B, conversion of the content CD into printing data PD, and transmission of a printing completion notification to the server 13.

According to the second embodiment, the following effects are obtained.

(10) When the transmission apparatus 14 transmits a content CD to the reception apparatus 15, the transmission apparatus includes the transmission notification unit 71 that transmits a transmission notification indicating that the content CD is transmitted to the reception apparatus 15, to the server 13. Accordingly, the server 13 can specify a user of the transmission apparatus 14 and a user of the reception apparatus 15 from the transmission of a content CD from the transmission apparatus 14 to the reception apparatus 15 and from transmitter specific information and receiver specific information which are added to a transmission notification. When the server 13 receives a printing completion notification from the reception apparatus 15, the server specifies a transmitter and a receiver by collating the added transmitter specific information and receiver specific information with transmission information added to a transmission notification which is previously received, and performs a point moving process of moving points from the specified transmitter to the specified receiver. Accordingly, the point management unit 28 of the server 13 can appropriately move points from the transmitter as a content providing source to the receiver when the reception apparatus 15 receives the printing completion notification.

(11) When the reception apparatus 15 prints a content CD received from the transmission apparatus 14, the reception apparatus includes the printing completion notification unit 73 that transmits a printing completion notification to the server 13. Accordingly, even when the content CD is transmitted to the reception apparatus 15 from the transmission apparatus 14 without passing through the server 13, the server 13 can move points from the user of the transmission apparatus 14 to the user of the reception apparatus 15 after confirming the completion of printing in the reception apparatus 15 on the basis of the printing completion notification.

(12) In a configuration in which a content is attached to an e-mail as in the first embodiment, the server 13 is required to have a function of a mail server. However, in the present embodiment, an e-mail having a content CD attached thereto is not required to pass through the server 13, and thus the server 13 may not have a function of a mail server. In addition, the conversion of a content CD into printing data PD is performed by the printer driver 72 on the reception apparatus 15 side, and thus the server 13 may not include a printing data conversion unit 26. As a result, it is possible to reduce the burden of the server 13 as compared with the configuration of the first embodiment.

Third Embodiment

Next, a third embodiment will be described with reference to FIG. 12 to FIGS. 14A and 14B. The present embodiment shows an example in which points are moved from a transmitter to a receiver if the receiver indicates the intention of printing a content CD in spite of not printing the content CD.

As illustrated in FIG. 13, a transmitter transmits an e-mail having a content CD attached thereto to a mail address destination only for a printer of a reception apparatus 15 from a transmission apparatus 14. When a server 13 receives the e-mail, the server acquires the attached content CD. A screen generation unit 25 acquires a thumbnail image of the content CD, and also acquires printing setting information added to the content CD. In addition, the screen generation unit 25 generates confirmation screen data CF for displaying a printing confirmation screen 40 using the thumbnail image and the printing setting information.

Figure 12:
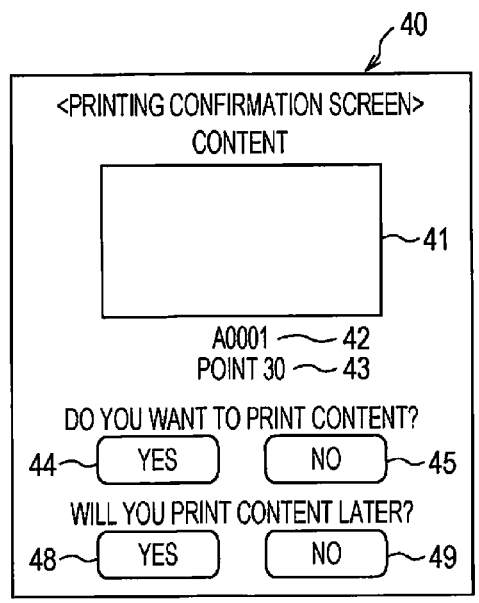
FIG. 12 is a schematic diagram illustrating a printing confirmation screen including a button for printing intention confirmation.

Here, as illustrated in FIG. 12, the printing confirmation screen 40 of the present embodiment is provided with a "yes" button 48 and a "no" button 49 for confirming the intention of printing, aside from buttons 44 and 45 for confirming printing. A receiver confirms an image 41 in the printing confirmation screen 40, and sometimes may not perform printing a content CD due to running-out of paper P or ink which is necessary for printing, in spite of having the intention of printing the content CD. In addition, the receiver sometimes desires to refrain from using paper P and ink because other printing is expected to be performed. When the receiver desires to print a content CD later due to such various circumstances in spite of having the intention of printing the content CD, the receiver selects the "yes" button 48 for confirming the intention of printing in the printing confirmation screen 40.

The terminal 17 includes a printing intention selection unit 75 for giving notice of the intention of printing a content CD, in addition to a display processing unit 39A, a printing setting display unit 39B, a printing setting change unit 39C, and a printing selection unit 39D which are the same as those in the first embodiment. In this example, the printing intention selection unit 75 selects whether or not to print a content CD by a user selecting either one of the buttons 48 and 49 provided in the printing confirmation screen 40 (see FIG. 12) using an operation unit 17A.

In addition, it is also possible to use, for example, a dedicated application (program) which is downloaded from the server 13 by the terminal 17 without using a program included in the confirmation screen data CF received from the server 13. In this case, the display processing unit 39A, the printing setting display unit 39B, the printing setting change unit 39C, the printing selection unit 39D, and the printing intention selection unit 75 which are included in the terminal 17 are constituted by a CPU that executes a dedicated application program.

Next, the action of a printing system 11 of the present embodiment will be described with reference to FIG. 12 to FIGS. 14A and 14B. The present embodiment is basically the same as the first embodiment, and is different from the first embodiment in that it is possible to notify the server 13 of a printing intention notification by selecting the "yes" button 48 when a content CD is intended to be printed and that points are moved at a point in time when the intention of printing is indicated.

Figure 14A:
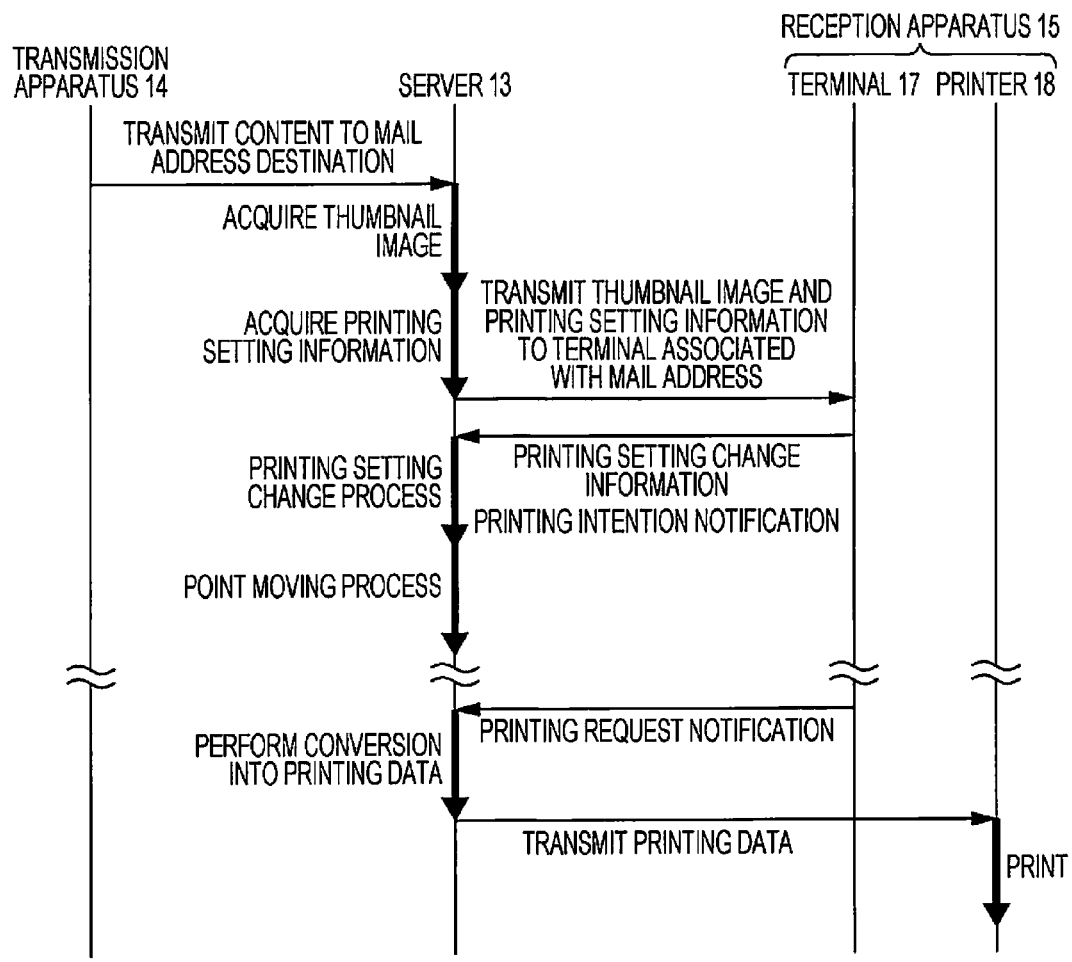
FIG. 14A is a sequence diagram illustrating the action of the printing system.

As illustrated in FIGS. 13 and 14A, an e-mail having a content CD attached thereto is transmitted to a mail address destination only for a printer on the reception apparatus 15 side from the transmission apparatus 14, and the e-mail is received in the server 13 having a function of a mail server. The server 13 acquires a thumbnail image and printing setting information from the content CD, and acquires a mail address of the terminal 17 which is associated with a mail address of the printer 18, with reference to a customer management DB 35 (FIG. 2). The server 13 transmits the thumbnail image and the printing setting information to the mail address destination of the terminal 17. At this time, the screen generation unit 25 of the server 13 generates confirmation screen data CF for displaying the printing confirmation screen 40, and transmits the confirmation screen data CF to the mail address destination of the terminal 17.

As a result of the confirmation of an image 41 (thumbnail image) in the printing confirmation screen 40, illustrated in FIG. 12, which is displayed on a display unit 17B of the terminal 17, a receiver sometimes desires to refrain from performing printing at the moment due to various circumstances in spite of having the intention of printing a content CD. Such various circumstances include running-out of paper having a desired paper type and paper size, running-out of ink, a case where the receiver desires to refrain from consuming paper or ink because another printing is expected to be performed, and the like.

In addition, when printing setting details 46 are desired to be changed as a result of the confirmation of the printing setting details on the printing confirmation screen 40 (see FIG. 5A), a receiver selects the setting change button 47 illustrated in FIG. 5A in the printing confirmation screen 40 using the operation unit 17A, and switches the screen of the display unit 17B to the printing setting change screen 50 illustrated in FIG. 5B. In a state where the printing setting change screen 50 is displayed, change to, for example, the printing setting details illustrated in FIG. 5B is performed using an operation unit 19A, and then printing setting change is performed by selecting an OK button 52. Next, the "yes" button 48 for confirming the intention of printing of the printing confirmation screen 40 is selected. Then, printing setting change information and a printing intention notification are transmitted to the server 13 from the terminal 17.

As illustrated in FIG. 14A, when the server 13 receives a printing intention notification, the server determines whether or not printing setting change has been performed. When the printing setting change has been performed, the receiver performs a printing setting change process. Next, the server 13 performs a point moving process. That is, when the server 13 receives the printing intention notification, the point management unit 28 performs the point moving process. In detail, the point management unit 28 moves C points from A points of a transmitter having a user ID of "a0001" to B points of a receiver having a user ID of "b0001" as illustrated in FIG. 7A, and sets the points of the transmitter to be "A−C" and sets the points of the receiver to be "B+C" as illustrated in FIG. 7B. In this manner, points are moved on condition that a content CD is intended to be printed. Therefore, the receiver can purchase printing materials such as paper P and an ink cartridge which are necessary for the printing of a content CD or the like by using the acquired points.

Thereafter, when an environment capable of constructing a content CD is prepared by a receiver purchasing paper P or an ink cartridge, the receiver selects the "yes" button 44 of the printing confirmation screen 40 using the operation unit 17A. Then, a printing request notification is transmitted to the server 13 from the terminal 17. Meanwhile, at this time, when printing setting change is performed again, printing setting change information is also transmitted to the server 13.

When the server 13 receives the printing request notification, the printing data conversion unit 26 converts the content CD into printing data PD on the basis of printing setting information. Then, the server 13 (specifically, the content transmission unit 29) transmits the printing data PD to a mail address destination only for a printer of the receiver. As a result, the printer 18 prints a content on paper P on the basis of the received printing data PD.

Figure 14B:
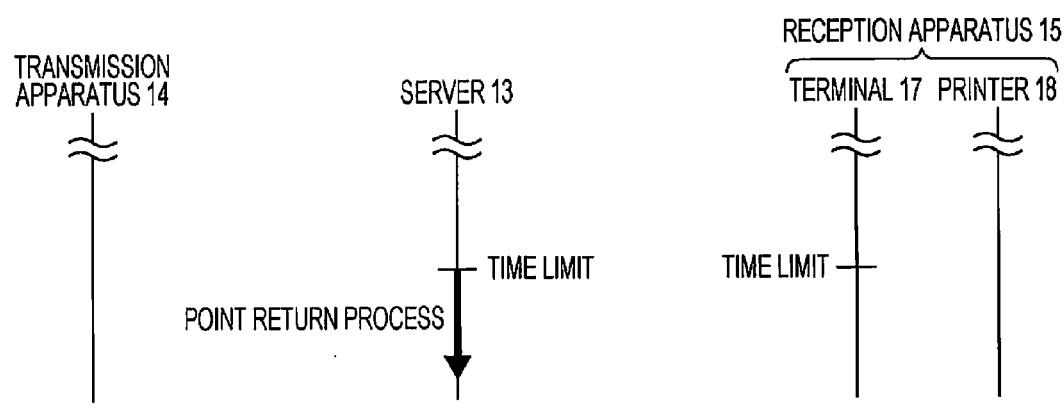
FIG. 14B is a sequence diagram illustrating a point return process when a content is not printed.

On the other hand, as illustrated in FIG. 14B, when a receiver does not print a content CD within the time limit, the server 13 performs a point return process if the time limit elapses. The point return process is performed by the point management unit 28. For example, as a result of the movement of points to a receiver indicating the intention of performing printing, it is assumed that the number of points of the transmitter is set to be "A" and the number of points of the receiver is set to be "B" as illustrated in FIG. 8A. As illustrated in FIG. 8A, the point management unit 28 moves D points corresponding to the amount of return from B points of the receiver having the user ID of "b0001" to A points of the transmitter having the user ID of "a0001". In other words, the point management unit 28 adds D points subtracted from B points of the receiver, to A points of the transmitter. As a result, the points of the transmitter and the receiver are set to be "A+D" and "B−D", respectively, as illustrated in FIG. 8B. In this manner, when the receiver having acquired points by indicating the intention of performing printing has not printed a content CD until the time limit, points corresponding to the amount of movement to the receiver when indicating the intention of performing printing are returned to the transmitter.

According to the third embodiment, the following effects are obtained.

(13) The reception apparatus 15 includes the printing intention selection unit 75 by which a receiver selects whether or not to have the intention of printing a content CD. When the intention of printing a content CD is selected by selecting the "yes" button 48, a printing intention notification is transmitted to the server 13 from the reception apparatus 15 (terminal 17 or printer 18). When the server 13 receives the printing intention notification, the server performs a process of moving points from a user (transmitter) of the transmission apparatus 14 to a user (receiver) of the reception apparatus 15. In this manner, the movement of points from the transmitter to the receiver is performed when the server 13 receives a printing intention notification from the reception apparatus 15. For example, when a printing material such as a printing medium or ink runs out, a receiver can select the "yes" button 48 and transmit the printing intention notification to the server 13 to thereby acquire points. Therefore, it is possible to use the acquired points to purchase a printing material.

(14) When a receiver does not print a content CD until the time limit, the point management unit 28 of the server 13 performs a process of returning points, corresponding to the movement from a transmitter to the receiver when a printing intention notification is received, from the receiver to the transmitter. Accordingly, even when points are moved before a content CD is printed, the points are returned if the content CD is not printed until the time limit. Thus, it is possible to prevent the receiver from acquiring points even though the content CD is not printed.

Meanwhile, the embodiments described above can also be modified into the following modes.

In the first and third embodiments, a configuration in which printing setting details cannot be changed may also be adopted.

In determining the number of points capable of being obtained when a content CD is printed, it is not essential for the consumption measurement unit 27 to measure ink consumption at the time of printing the content CD. For example, the number of points may be determined from a paper size and a printing mode. In addition, the number of points may be determined only from a paper size. Further, the number of points capable of being obtained by printing per one content, regardless of printing setting details, may be fixed.

A configuration may also be adopted in which the server 13 transmits either one of a thumbnail image and printing setting information to the reception apparatus 15. For example, a configuration may also be adopted in which the server 13 transmits confirmation screen data CF (an example of display data) including an image 41 of a content and an item 43 of the number of points to the reception apparatus 15 and a receiver confirms the image 41 and the number of points on the display unit of the reception apparatus 15 and then can select whether or not to print a content CD by selecting the button 44 or 45 using an operation unit. In this configuration, the reception apparatus 15 includes the display processing unit 39A and the printing selection unit 39D. In addition, a configuration may also be adopted in which the server 13 transmits, for example, confirmation screen data CF (an example of display data) including the printing setting details 46 and the item 43 which is the number of points to the reception apparatus 15 and a receiver confirms the printing setting details 46 and the number of points on the display unit of the reception apparatus 15 and then can select whether or not to print a content CD by selecting the button 44 or 45 using an operation unit. In this configuration, the reception apparatus 15 includes the printing setting display unit 39B and the printing selection unit 39D. Further, a configuration may also be adopted in which the server 13 does not transmit both a thumbnail image and printing setting information to the reception apparatus 15. In this case, a configuration is adopted in which, for example, confirmation screen data CF including the number of points is transmitted to the reception apparatus 15 from the server 13 and a receiver confirms the number of points on the display unit of the reception apparatus 15 and then can select whether or not to print a display unit by selecting the button 44 or 45 using an operation unit. In this configuration, the reception apparatus 15 includes the display processing unit 39A and the printing selection unit 39D for displaying the number of points.

In the first and third embodiments, the printing selection unit 39D may be removed from the terminal 17 or the printer 18. In other words, a content CD transmitted from the transmission apparatus 14 may also be unilaterally printed on paper P by the printer 18. In this case, the content CD is unilaterally printed by the printer 18, and points are moved from a transmitter to a receiver. For example, a malicious transmitter's transmission of a large number of contents CD from the transmission apparatus 14 to the printer 18 is suppressed.

In the first and third embodiments, when the reception apparatus 15 completes the printing of a content CD, the printing completion notification unit 73 transmitting a printing completion notification from the reception apparatus 15 to the server 13 may be provided. In this case, the movement of points from a user of the transmission apparatus 14 to a user of the reception apparatus 15 is performed after the printing of a content CD is completed. It is possible to suppress the movement of points in spite of incomplete printing of a content CD such as, for example, failed printing.

A destination (address) of a reception apparatus when a transmission apparatus transmits a content to the reception apparatus is not limited to a mail address. The destination may be a user account (SNS account) for having access to a social networking service (hereinafter, referred to as "SNS"). Setting data (table data) stored in a server is associated with a user account for having access to the SNS server, and an address of the printer 18 desired to serve as a printing destination on the Internet or a mail address only for a printer. The server acquires positing of a user account registered from the SNS server, and transmits printing data obtained by converting a content CD added to the positing to an address (for example, a mail address destination only for a printer) of the printer 18 which is associated with the user account. Meanwhile, the SNS may be "TWITTER (registered trademark)", "FACEBOOK (registered trademark)", "MIXI (registered trademark)", "GREE (registered trademark)", and the like that provide a posting service.

The computation of the consumption of a printing material due to the printing of a content may be performed through actual measurement or simulation. In the case of the actual measurement, a controller within a printer or a printer driver of a host device connected to a printer may measure a change in the residual quantity in an ink accommodation unit (an ink cartridge, an ink pack, or an ink tank) using a sensor, or may measure the change from the amount of ink ejection from a printing head which is necessary for the printing of a content. The ink ejection amount may be measured on the basis of the number of ejections from the printing head and the amount of ink per one ejection. When these measured values are used, pieces of information of the measured values are transmitted to the server 13 from the printer 18 directly or through the terminal 17.

The functional units of the server 13 are realized by software using a CPU that executes a printing control program, but may be realized by hardware using an electronic circuit such as an ASIC or may be realized by corporation of software and hardware.

A printing apparatus may be not only an inkjet type printer but also a dot impact type or electrophotographic type printer. In addition, the printing apparatus is not limited to an apparatus dedicated to printing, and may be a multi-function printer having a copy function and a scanner function. Further, the printing apparatus may be any of a serial printer, a line printer, and a page printer. In addition, the printing apparatus may be a portable, small-sized, medium-sized, or large-sized printer. For example, the printing apparatus may be a printer for business or a large printer.

A printing medium is not limited to paper, and may be a film made of a resin, metal foil, a metal film, a composite film of a resin and a metal (laminated film), fabric, nonwoven fabric, a ceramic sheet, or the like.

What is claimed is:

1. A printing system comprising:
   a transmission apparatus that transmits a content to be printed;
   a reception apparatus having a printer that receives the content and prints the content; and
   a server that is connected to the transmission apparatus and the reception apparatus through a network, and stores points for using a service for each of users including a first user of the transmission apparatus and a second user of the reception apparatus, wherein the server subtracts points according to printing of the content from points of the first user of the transmission apparatus, and adds the points according to the printing of the content to points of the second user of the reception apparatus while subtracting the points according to the printing of the content from the points of the first user of the transmission apparatus.

2. The printing system according to claim 1, wherein the transmission apparatus includes a processor that transmits the content to the reception apparatus from the transmission apparatus without passing through the server and transmits a transmission notification indicating that the content is transmitted to the reception apparatus, to the server, wherein the reception apparatus includes a processor that transmits a printing completion notification to the server when completing printing of the content received from the transmission apparatus without passing through the server, and wherein the server gives the points according to the printing of the content when receiving the printing completion notification from the reception apparatus.

3. The printing system according to claim 1, wherein the reception apparatus is a terminal and a printing apparatus, or is a printing apparatus.

4. A server included in the printing system according to claim 1, the server comprising:

a processor that manages the points for using the service for the second user of the reception apparatus, wherein the processor gives the points according to the printing of the content transmitted to the reception apparatus from the transmission apparatus when the reception apparatus prints the content, to the second user of the reception apparatus.

5. The server according to claim 4, wherein the server manages the points for using the service for each of users including the first user of the transmission apparatus and the second user of the reception apparatus, and performs a process of moving the points according to the printing of the content from the first user of the transmission apparatus to the second user of the reception apparatus.

6. The server according to claim 5, wherein the processor moves the points according to consumption of a printing material used to print the content from the first user of the transmission apparatus to the second user of the reception apparatus.

7. The server according to claim 5, wherein the processor gives the points when receiving a printing completion notification indicating that printing of the content is completed, from the reception apparatus.

8. The server according to claim 5, wherein the processor gives the points when receiving a printing intention notification indicating that the content is intended to be printed, from the reception apparatus.

9. The server according to claim 5, wherein details of the content are displayed on a display of the reception apparatus by transmitting display data for displaying the details of the content to the reception apparatus, and wherein the content is transmitted to the reception apparatus when receiving a printing request notification indicating a request for printing the content, from the reception apparatus.

10. The server according to claim 5, wherein the processor gives points of a value according to printing setting details of the content.

11. The server according to claim 5, wherein printing setting details based on printing setting information are displayed on a display of the reception apparatus by transmitting the printing setting information of the content to the reception apparatus, and wherein the processor moves points of a value according to changed printing setting information of which the printing setting details are changed when receiving the changed printing setting information from the reception apparatus.

12. The server according to claim 5, wherein the content is converted into printing data and is then transmitted to the reception apparatus.

13. The server according to claim 5, wherein when a selection result notification indicating the selection whether or not to print the content is received from the reception apparatus, printing data converted from the content is transmitted to the reception apparatus if the selection result notification is a printing request notification indicating that printing of the content is selected, and conversion of the content into printing data and transmission of the content are not performed if the selection result notification is a non-printing notification indicating that printing of the content is not selected.

14. A reception apparatus included in the printing system according to claim 1, the reception apparatus comprising:

a display;

a processor that receives display data for displaying details of the content transmitted from the transmission apparatus and the number of points capable of being acquired by printing of the content, from the server and displays the details of the content and the number of points on the display on the basis of the display data; and the printer that receives the content and prints the content, wherein the processor selects whether or not to print the content transmitted from the transmission apparatus, wherein when printing of the content is selected by the processor, printing data of the content is received from the server.

15. A reception apparatus included in the printing system according to claim 1, the reception apparatus comprising:

an operation panel which is capable of inputting data by operation;

a display;

a processor that receives display data for displaying printing setting details of the content transmitted from the transmission apparatus, from the server and displays the printing setting details of the content on the display on the basis of the display data; and the printer that receives the content and prints the content, wherein the processor changes the printing setting details displayed on the display by operating the operation panel, wherein data of the printing setting details changed by the processor is transmitted to the server, and wherein the number of points moved to the user of the reception apparatus from the user of the transmission apparatus by the server changes depending on the changed printing setting details.

16. The printing system according to claim 1, wherein the transmission apparatus further transmits printing setting information for the content, wherein the reception apparatus further receives the printing setting information, and performs the printing control of the content according to a print setting that is set based on the printing setting information, and wherein the server updates the points of the second user of the reception apparatus according to the print setting for the content.

17. A printing method used by a printing system in which a transmission apparatus, a reception apparatus, and a server are connected to each other through a network and the reception apparatus receives and prints a content transmitted from the transmission apparatus, the method comprising:

causing the transmission apparatus to transmit the content to be printed;

causing a printer of the reception apparatus to receive the content and print the content; and causing the server to store points for using a service for each of users including a first user of the transmission apparatus and a second user of the reception apparatus, to subtract points according to printing of the content from points of the first user of the transmission apparatus, and to add the points according to the printing of the content to points of the second user of the reception apparatus while subtracting the points according to the printing of the content from the points of the first user of the transmission apparatus.

* * * * *